United States Patent
Skodinis et al.

(10) Patent No.: US 10,984,022 B2
(45) Date of Patent: *Apr. 20, 2021

(54) CLUSTERING PROCESS FOR OBJECTS USING LINK COUNTS

(71) Applicant: SAP SE, Walldorf (DE)

(72) Inventors: Konstantin Skodinis, Heidelberg (DE); Matthias Schmitt, Speyer (DE)

(73) Assignee: SAP SE, Walldorf (DE)

( * ) Notice: Subject to any disclaimer, the term of this patent is extended or adjusted under 35 U.S.C. 154(b) by 228 days.

This patent is subject to a terminal disclaimer.

(21) Appl. No.: 16/049,804

(22) Filed: Jul. 30, 2018

(65) Prior Publication Data

US 2020/0034477 A1    Jan. 30, 2020

(51) Int. Cl.
*G06F 7/00* (2006.01)
*G06F 17/00* (2019.01)
*G06F 16/28* (2019.01)
*G06F 16/22* (2019.01)

(52) U.S. Cl.
CPC ........ *G06F 16/285* (2019.01); *G06F 16/2228* (2019.01)

(58) Field of Classification Search
None
See application file for complete search history.

(56) References Cited

U.S. PATENT DOCUMENTS

| | | | |
|---|---|---|---|
| 6,598,054 B2 | 7/2003 | Schuetze et al. | |
| 6,882,998 B1 | 4/2005 | Stemp | |
| 7,676,518 B2 | 3/2010 | Niekamp | |
| 8,041,735 B1 * | 10/2011 | Lacapra | G06F 16/13 |
| | | | 707/783 |
| 9,082,232 B2 | 7/2015 | Evans | |
| 9,418,335 B1 * | 8/2016 | Lerner | G06N 5/02 |
| 2003/0110181 A1 * | 6/2003 | Schuetze | G06F 16/904 |

(Continued)

FOREIGN PATENT DOCUMENTS

CN     106991430 A     7/2017

OTHER PUBLICATIONS

P. Santhi et al., "Improving the Efficiency of Image Clustering Using Modified Non-Euclidean Distance Measures in Data Mining", Int J Comput Commun, ISSN 1841-9836, Feb. 2014, pp. 56-61.

(Continued)

*Primary Examiner* — Tuan A Pham
(74) *Attorney, Agent, or Firm* — Fountainhead Law Group P.C.

(57) ABSTRACT

In some embodiments, a method receives a set of objects for creating clusters based on a similarity measure between the objects and generates a data structure for the objects. The method generates link counts for objects by constructing links between objects in the set of objects based on entries between the objects. A link is constructed between the objects when the entry for the respective objects includes a first value. An object is selected that has a largest link count. The link count being a number of objects that are linked to the selected object. A cluster is created including the selected object and any objects that are linked to the selected object via the links. Then, the objects in the cluster are removed from the set of objects and a link count is reduced for objects that are linked to the removed objects. This process is continued for remaining objects.

20 Claims, 39 Drawing Sheets

(56) References Cited

U.S. PATENT DOCUMENTS

2004/0249844 A1* 12/2004 Kotani .................... G06F 16/58
2008/0046430 A1*  2/2008 Niekamp ............... G06Q 10/06
2015/0138207 A1*  5/2015 Evans ................ G06K 9/00469
                                                          345/440
2017/0093798 A1*  3/2017 McKinion ........... H04L 63/0281

OTHER PUBLICATIONS

Sumedha Sirsikar et al., "Clustering using Concentric Rings and Rectangular Region Formations in Wireless Sensor Networks", International Journal of Applied Engineering Research ISSN 0973-4562 vol. 13, No. 6, Feb. 2014, 9 pages.

* cited by examiner

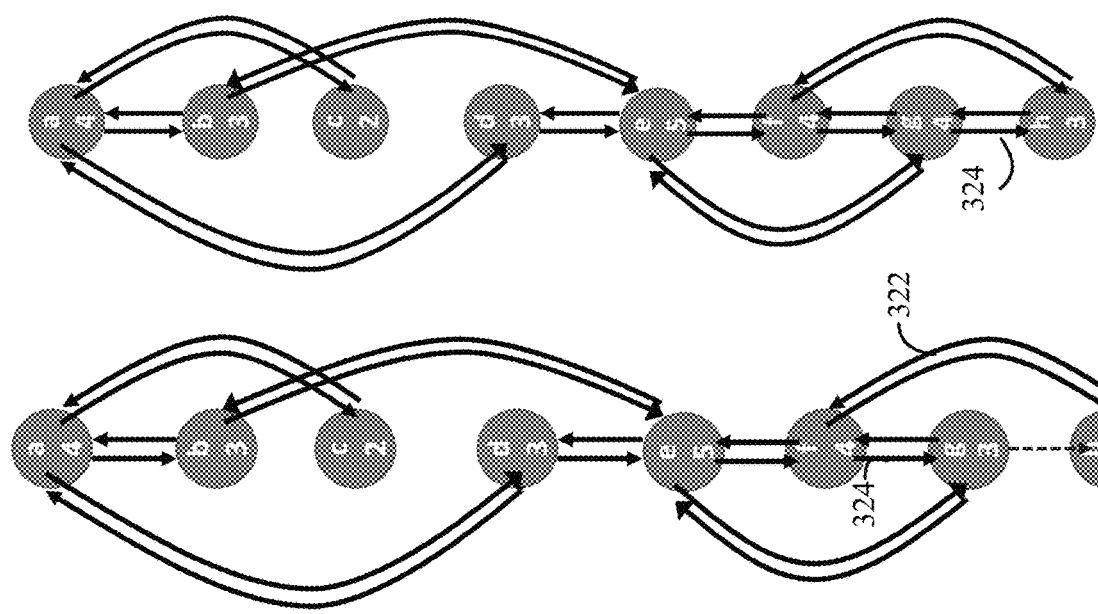

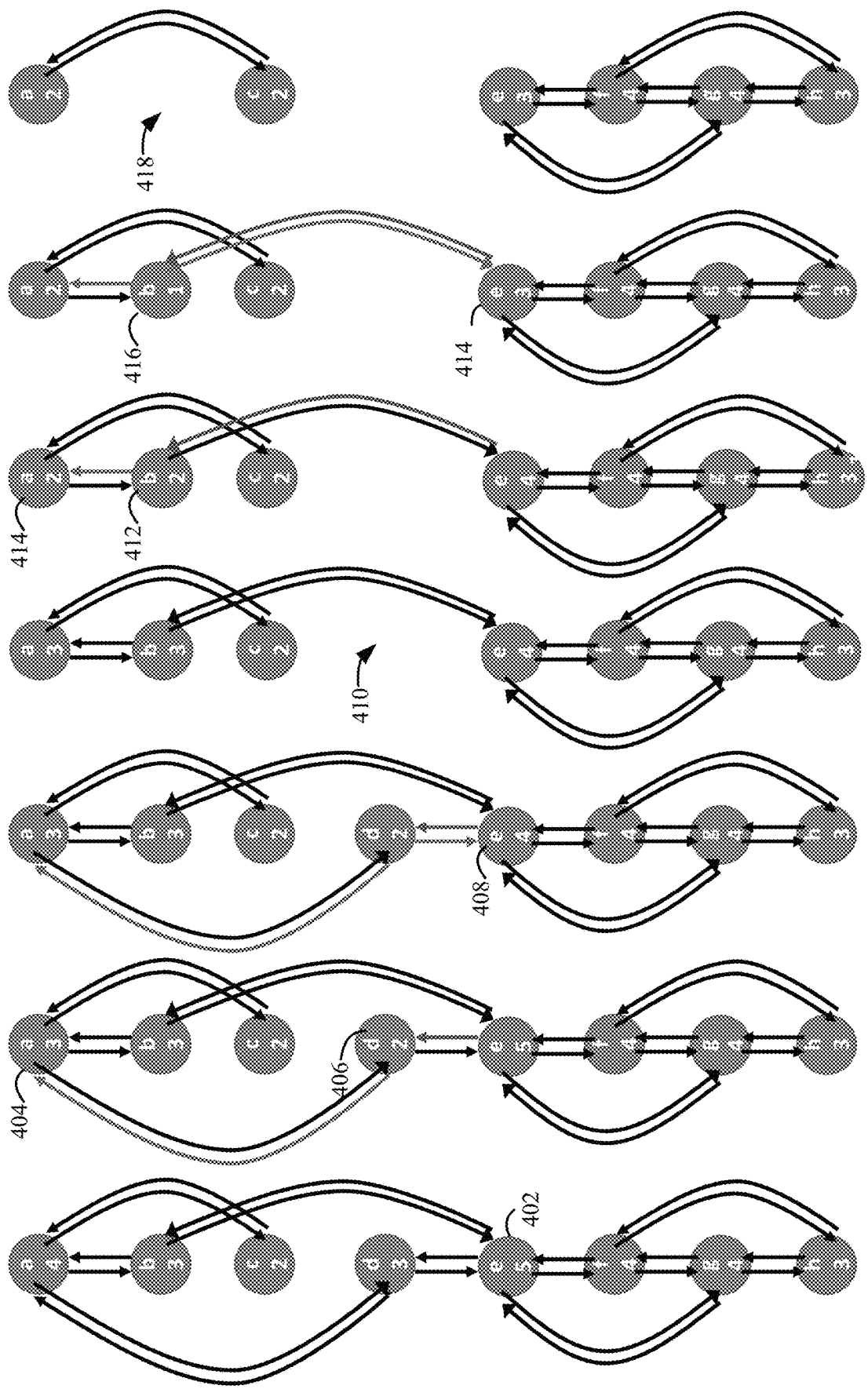

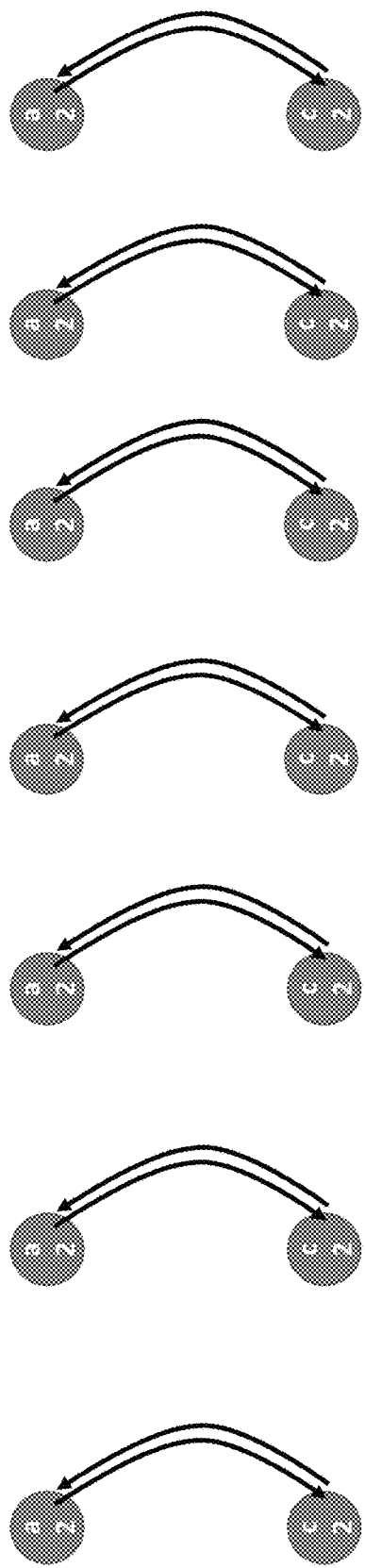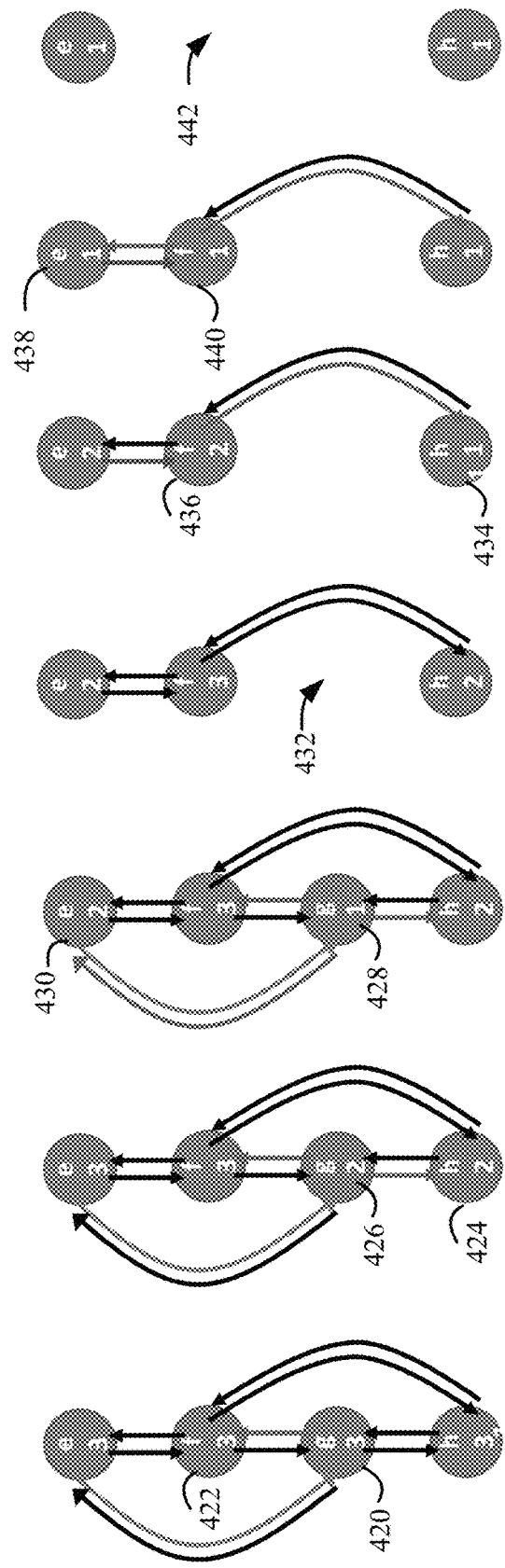

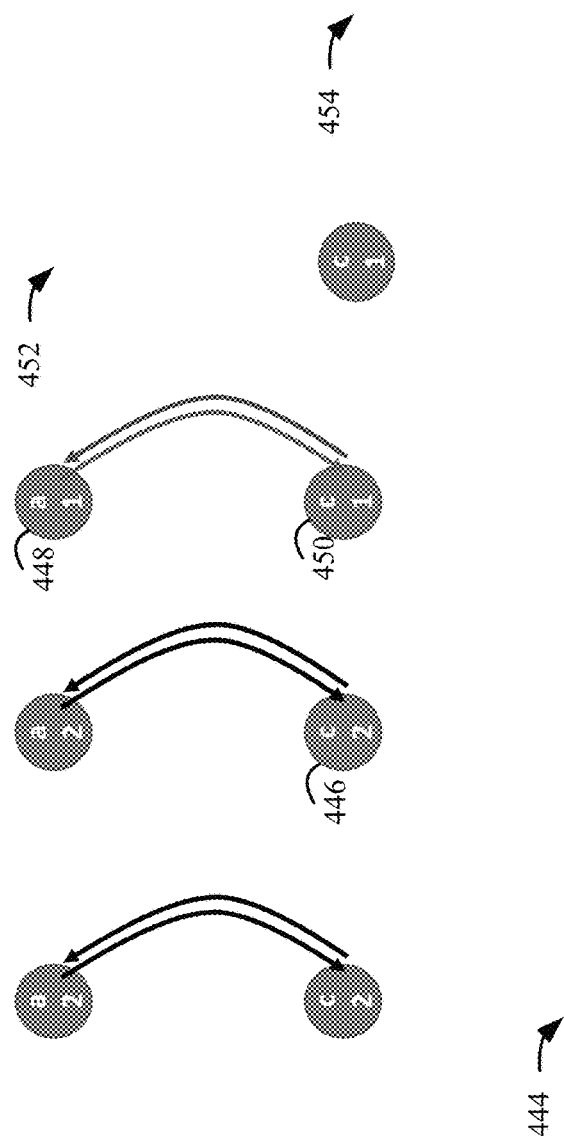
FIG. 4O   FIG. 4P   FIG. 4Q   FIG. 4R   FIG. 4S

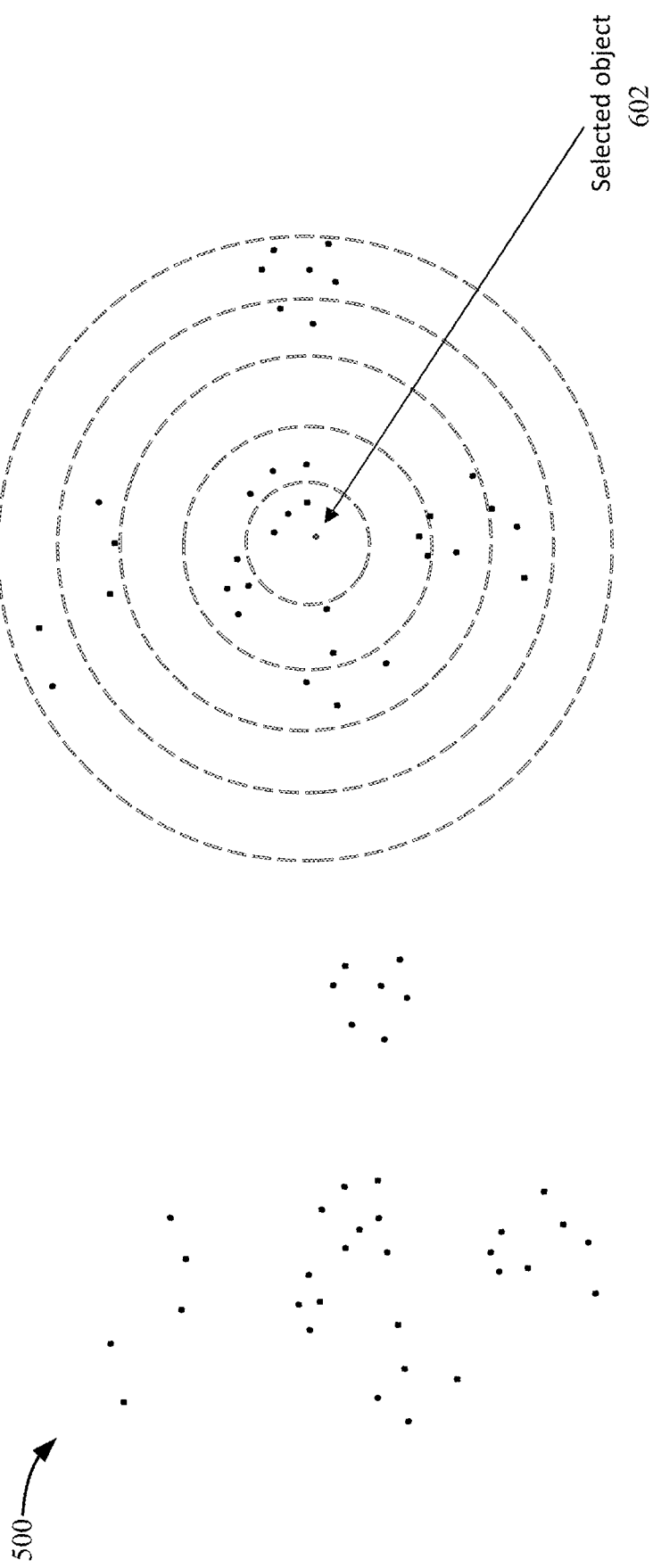

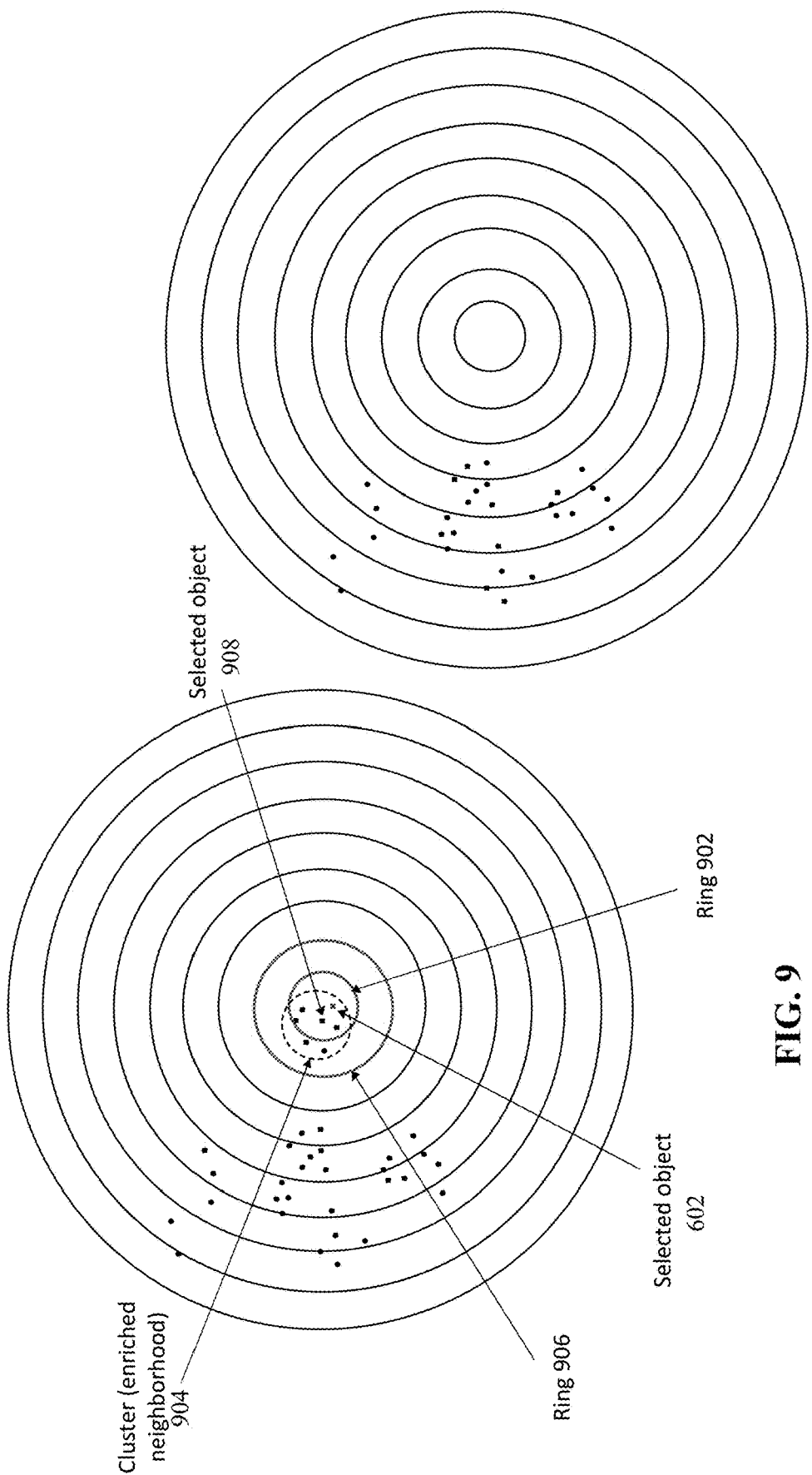

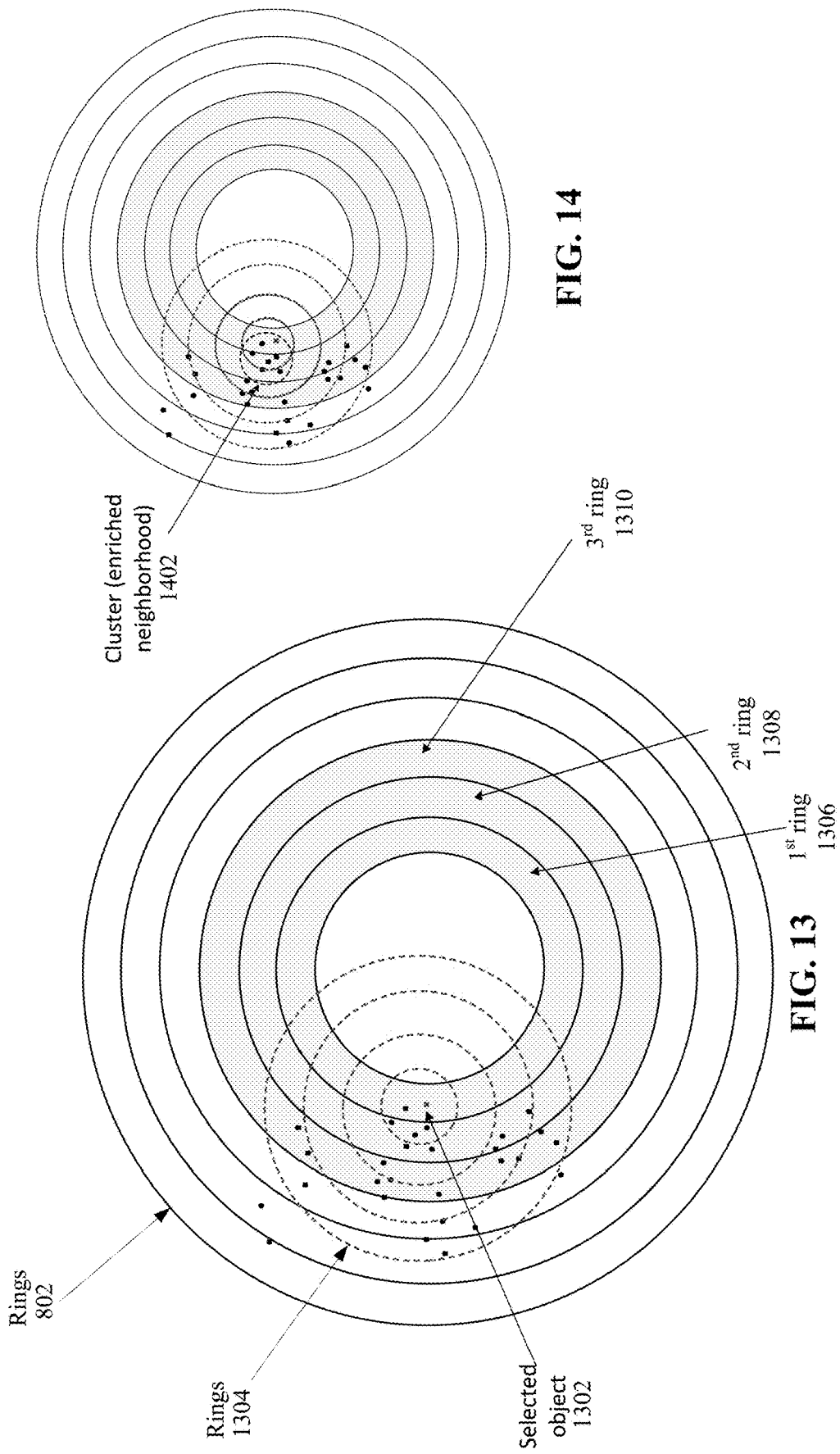

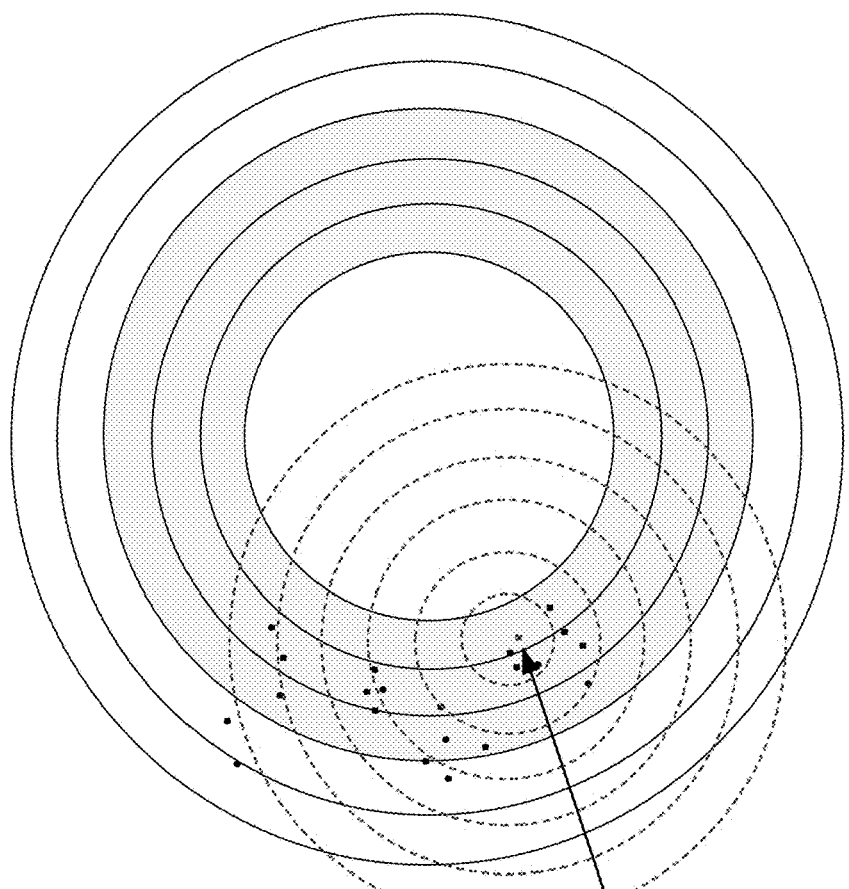
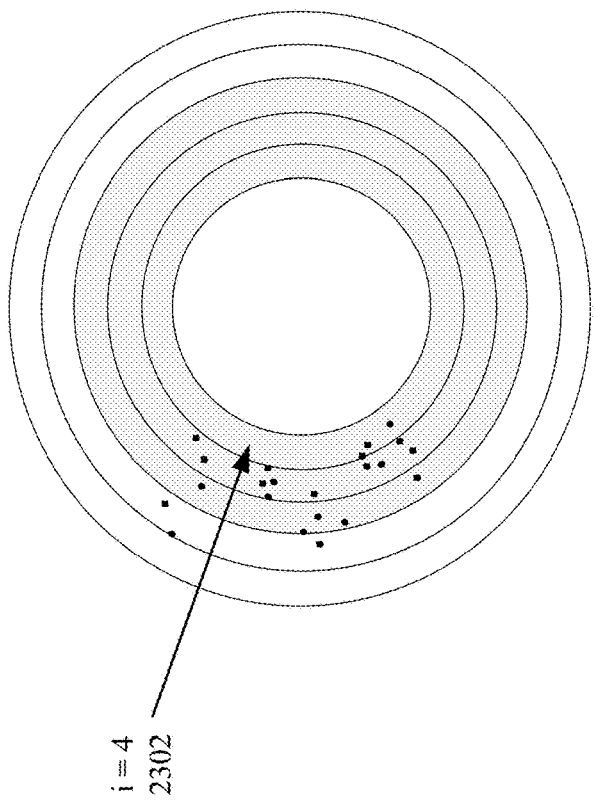
FIG. 16
FIG. 17

Cluster (enriched neighborhood) 2502

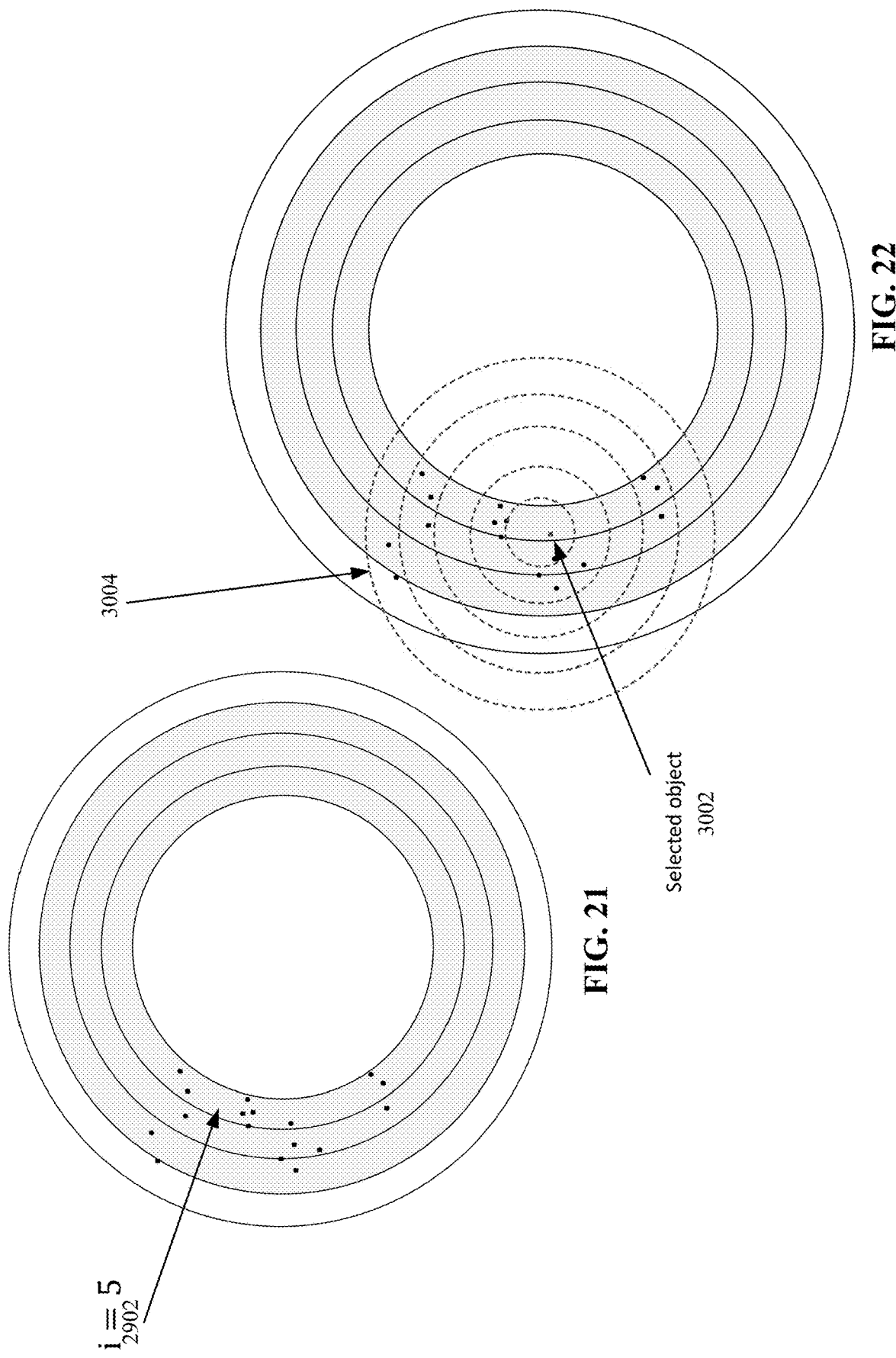

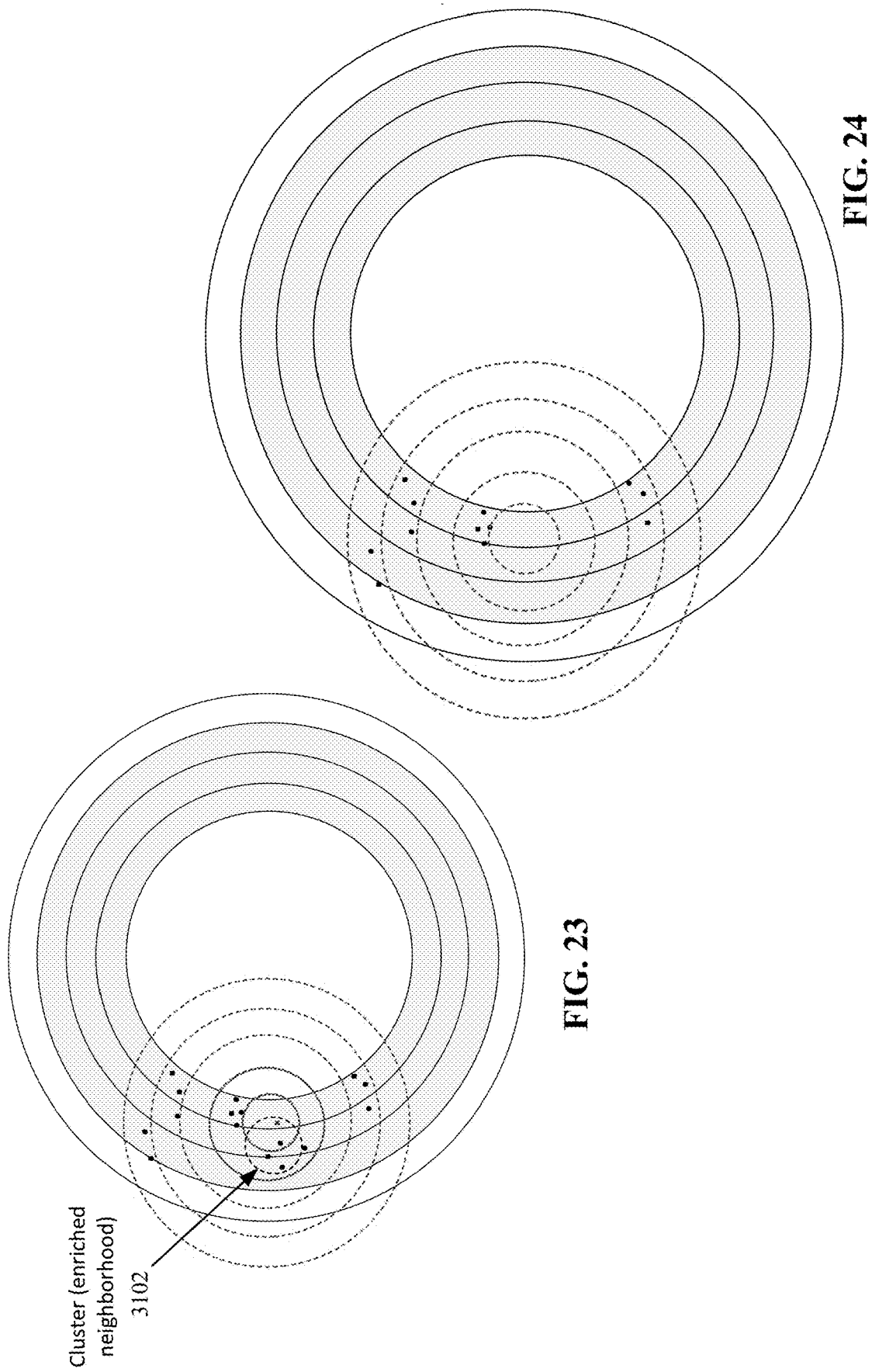

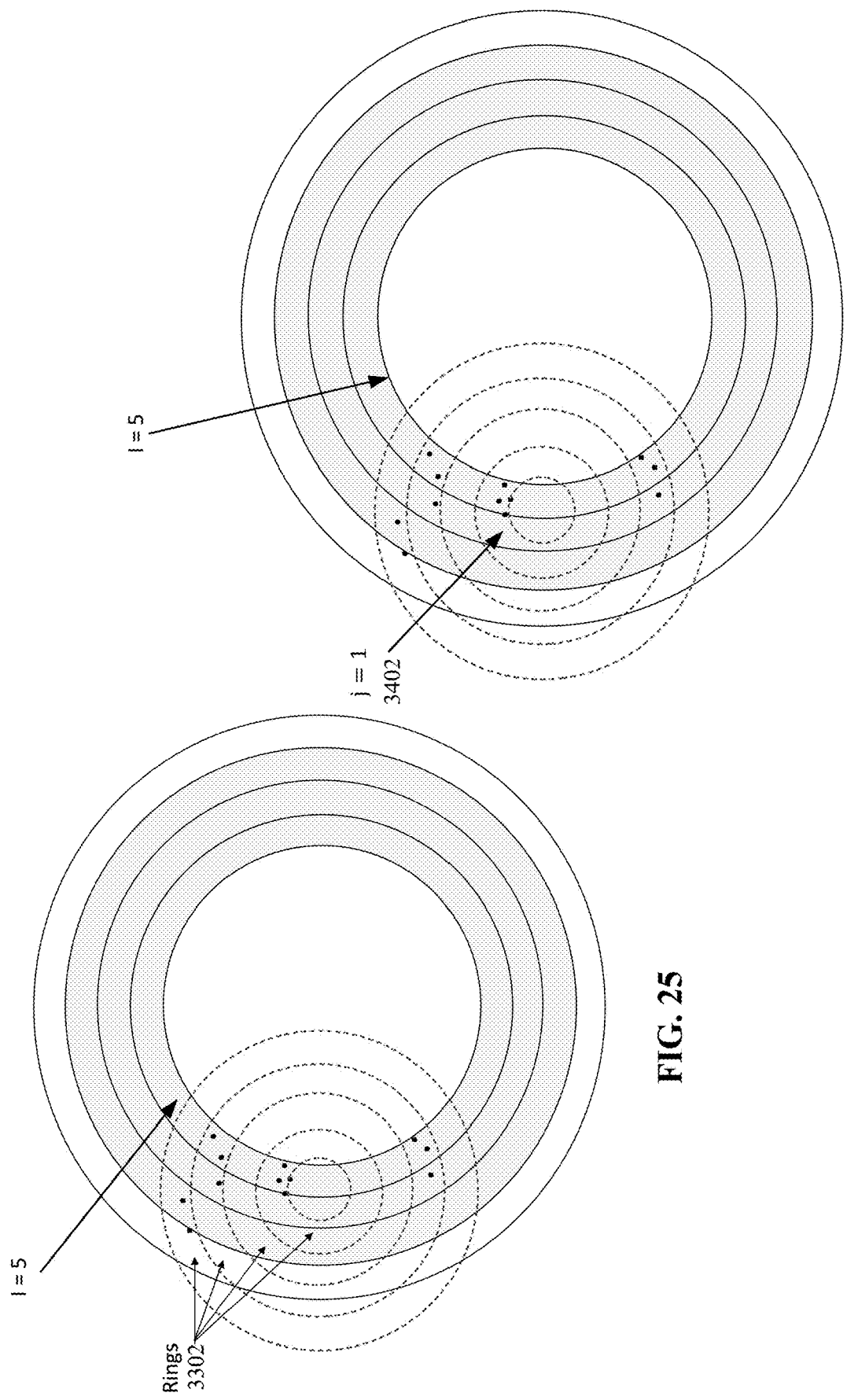

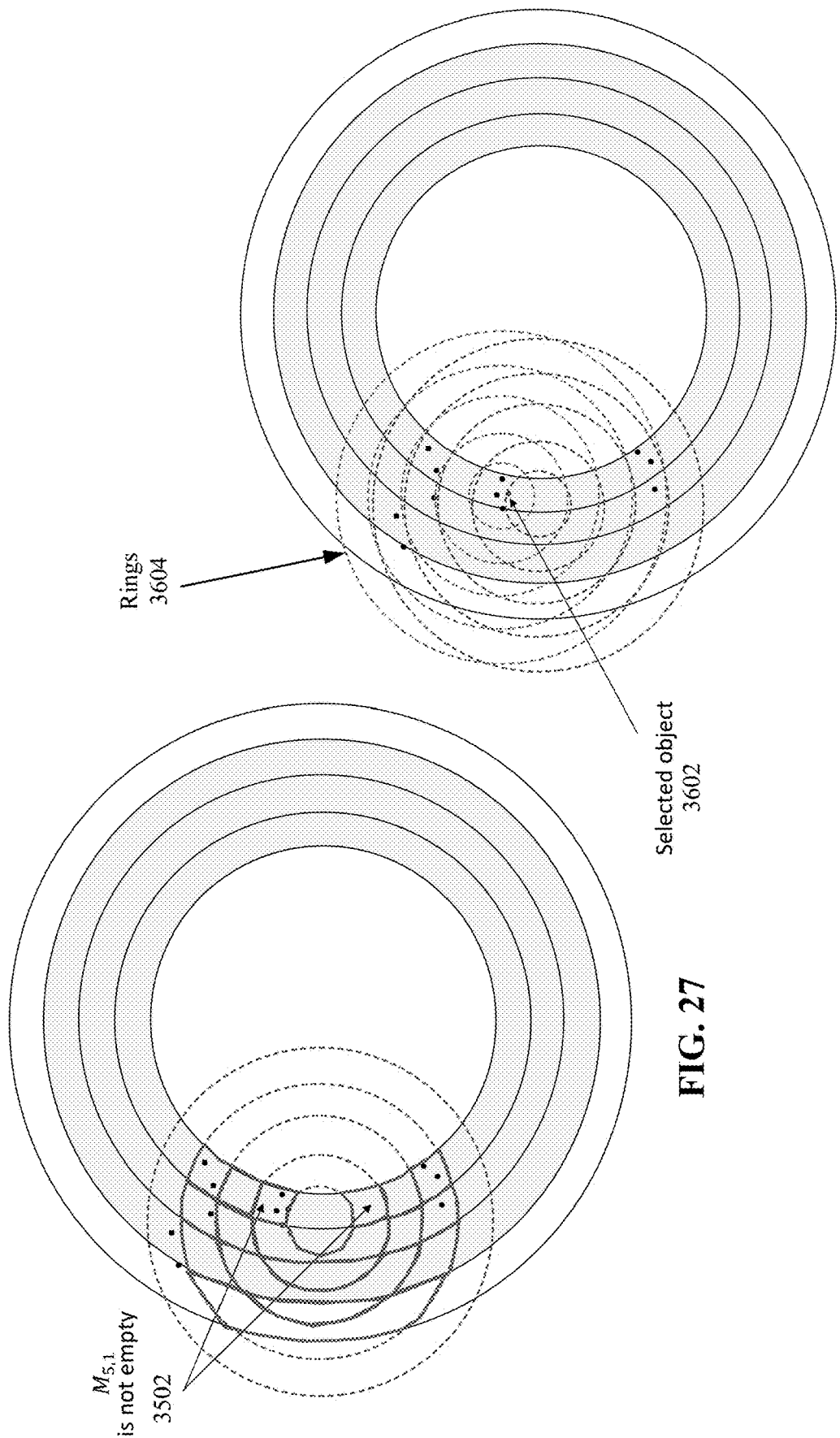

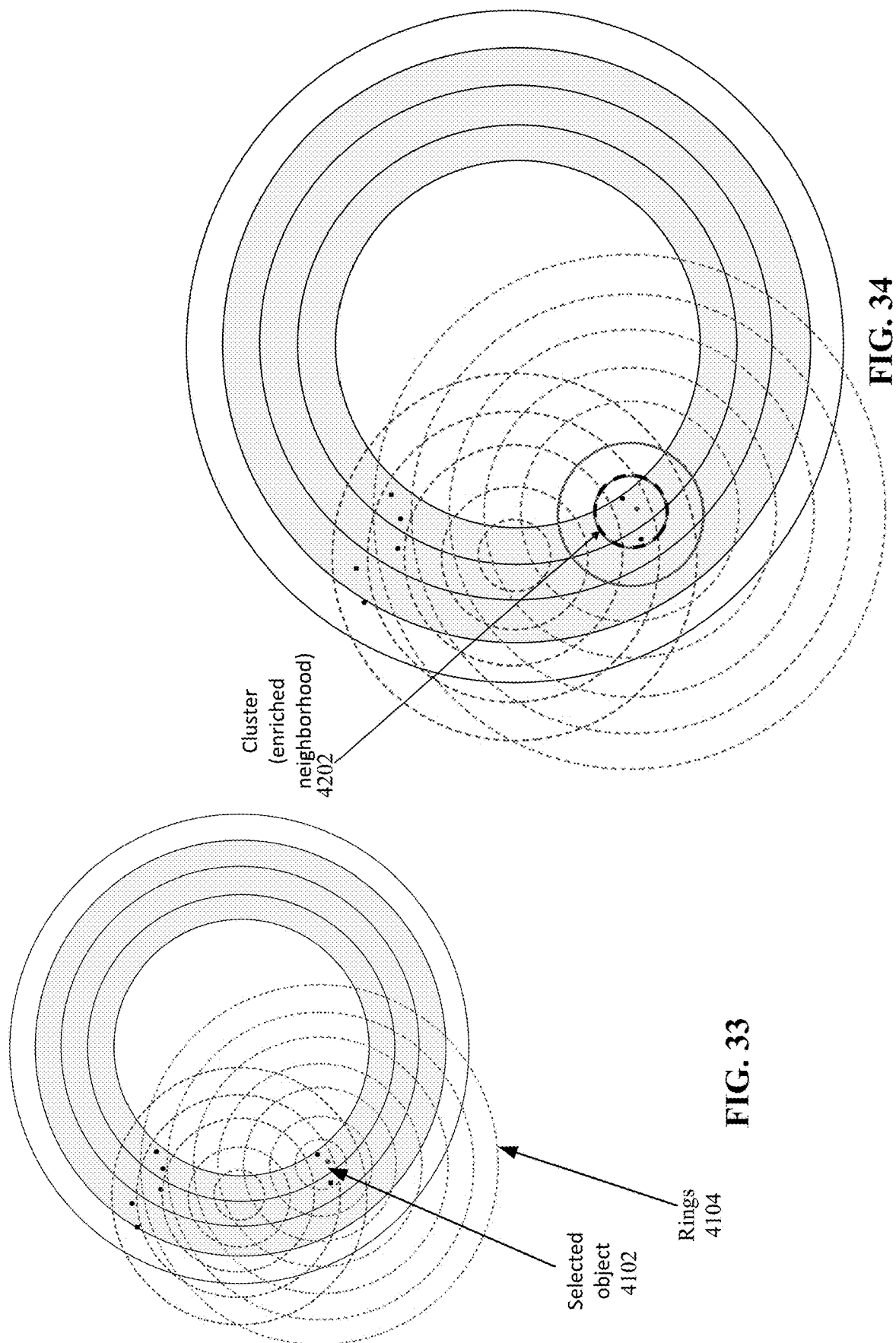

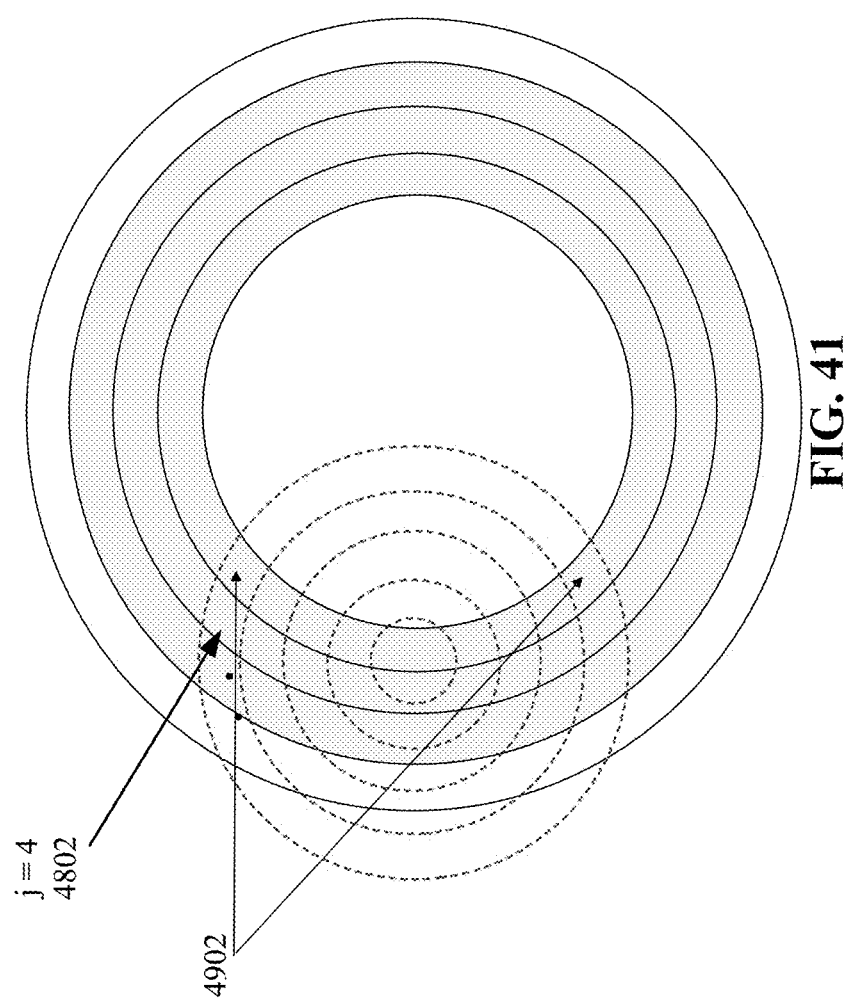

5800

| Product | Sales Figure Level |
|---------|--------------------|
| $o_1$ | 1 |
| $o_2$ | 2 |
| $o_3$ | 3 |
| $o_4$ | 4 |
| $o_5$ | 5 |
| $o_6$ | 10 |
| $o_7$ | 11 |
| $o_8$ | 12 |
| $o_9$ | 13 |
| $o_{10}$ | 20 |

| Product | Sales Figure Level | Cost Level |
|---------|--------------------|------------|
| $o_1$ | 1 | 2 |
| $o_2$ | 2 | 1 |
| $o_3$ | 3 | 2 |
| $o_4$ | 4 | 1 |
| $o_5$ | 5 | 3 |
| $o_6$ | 10 | 9 |
| $o_7$ | 11 | 9 |
| $o_8$ | 12 | 10 |
| $o_9$ | 13 | 10 |
| $o_{10}$ | 20 | 10 |

FIG. 52

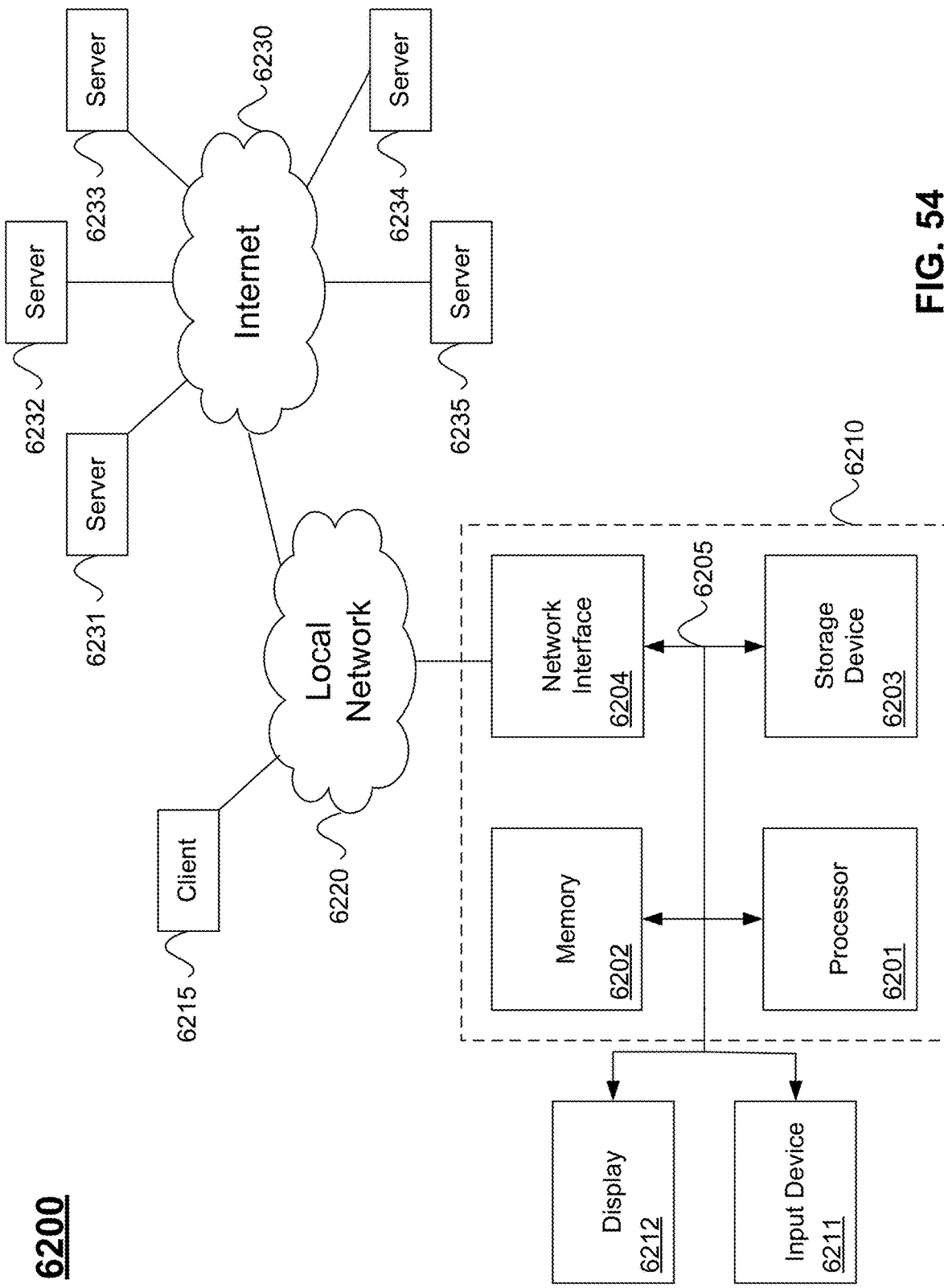

CLUSTERING PROCESS FOR OBJECTS USING LINK COUNTS

CROSS REFERENCE TO RELATED APPLICATIONS

The present disclosure is related to U.S. Patent application Ser. No. 16/049,792 entitled "CLUSTERING PROCESS FOR OBJECTS USING COMPARISON STRUCTURES", filed concurrently, the contents of which is incorporated herein by reference in its entirety.

BACKGROUND

Companies may store an enormous amount of objects in databases, such as business partners (e.g., customers and suppliers), products (e.g., materials), articles, employees, and custom-developed object types. The large amount of objects may make the analysis of the objects very difficult or impossible. However, the companies may require a consolidated view of the objects without duplication for company-wide analysis and reporting. Without the consolidated data, simple queries or questions, such as what products does the company offer, who are our customers, and who are our suppliers, cannot be easily answered.

One method for generating consolidated data is clustering the objects into clusters where each cluster does not include any duplicates. The clustering partitions a large amount of data into groups such that all members of a cluster are similar in some aspect. Thus, a cluster is a collection of objects that are similar to each other and that are dissimilar to objects belonging to other clusters. The similarity/dissimilarity of clusters may be expressed by some criteria.

The generation of clusters may be a highly intensive computing process. The process is also more difficult as the number of objects for a company keeps increasing. Thus, the comparison of objects to determine the clusters is an expensive calculation.

BRIEF DESCRIPTION OF THE DRAWINGS

FIG. 3A depicts a table that lists objects and links between the objects according to some embodiments.

FIGS. 3B to 3I illustrate a linking process between objects to generate link counts according to some embodiments.

FIGS. 4A to 4S illustrate a first clustering process using the link counts according to some embodiments.

FIG. 5 depicts a set of objects for a second clustering process according to some embodiments.

FIGS. 6 to 46 depict the second clustering process according to some embodiments.

FIG. 50 depicts a table of the objects and sales figure levels according to some embodiments.

FIG. 52 depicts a table of the objects, sales figure levels, and cost levels according to some embodiments.

FIG. 54 illustrates hardware of a special purpose computing machine configured with a computing system according to one embodiment.

DETAILED DESCRIPTION

Figure 1:
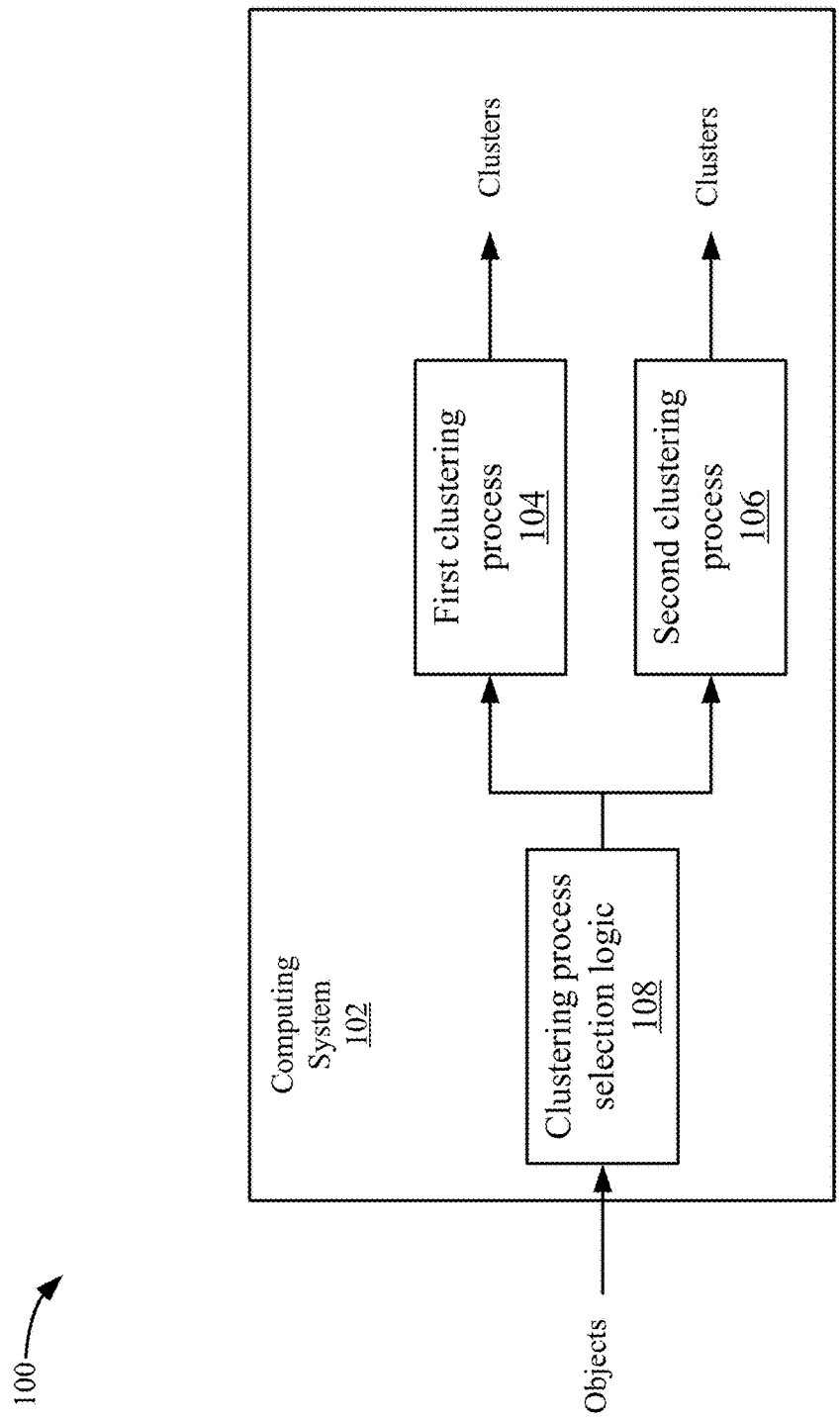
FIG. 1 depicts a simplified system of a method for performing a clustering process according to some embodiments.

Described herein are techniques for a data analysis system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments perform a clustering process to cluster objects into clusters. As will be discussed in more detail below, some embodiments may determine whether a first clustering process or a second clustering process should be performed. The selection of which process to perform may be based on comparing the set of objects to a condition, such as whether a similarity measure, such as a distance, that is used to define which objects should be clustered together fulfills a triangular inequality condition. The triangular inequality condition states that for any triangle, the sum of the lengths of any two sides must be greater than or equal to the length of the remaining side. Given the distances between the objects in the form of a distance table, then for every triple of objects, it can be checked whether the triangle inequality condition is fulfilled. When the distance is applied to the set of objects and does not fulfill the triangular inequality condition, some embodiments perform a first clustering process that compares links between all of the objects to determine clusters. If the triangular inequality condition is fulfilled, then a second clustering process may be performed. The second process does not compare distances between all of the objects in the set of objects.

In the first clustering process, a computing device receives a set of objects for creating clusters. The clusters are created based on a distance between the objects. The smaller the distance between two objects the more similar the objects and they can belong to the same cluster. For example, a table is created for the set of objects where a first value is inserted into an entry between objects when a distance between the objects is less than a value, such as the radius of a cluster. A second value is inserted in the entry between objects when the distance is greater than the value. The computing device generates the table by performing comparisons between all of the objects.

The first clustering process then constructs links between objects in the set of objects based on the entries between the objects. The first clustering process constructs a link between two objects if and only if their similarity (expressed by their distance) is high based on a threshold (e.g., distance or other value), such that both objects can belong to the same cluster. For example, depending on whether entries include the first value or the second value, the first clustering process may add a link or not add a link between the objects. For example, when an entry for two objects includes a first value, then the first clustering process adds a link between the objects and when the entry includes a second value, then the first clustering process does not construct a link between the objects.

The first clustering process generates a link count between the objects where the link count indicates how many links each object has to other objects. Then, the first clustering process starts to determine clusters. First, the first clustering process selects an object that has the highest link count.

The first clustering process creates a cluster including the selected object and any objects that are linked to the selected object via the links. For example, a cluster may include objects a, b, c, and so on from the set. Then, the first clustering process removes the objects in the cluster from being considered as links to other objects not in the cluster and reduces a link count for objects that are linked to the removed objects. The above process is then performed again where an object with the highest link count of the remaining objects is then selected, a new cluster is created, and then the objects in that new cluster are removed and the link count for the objects that are linked to the removed objects are reduced. The process continues to select new clusters until no other clusters are available for selection.

The second clustering process receives a set of objects for creates clusters based on a distance between the objects. The second clustering process may use circular structures that are generated using the distance, such as the distance is a radius for rings. A ring may be a region bounded by two concentric circles. The rings may be used in a two dimensional object space or may be used in a three dimensional or higher object space (e.g., spheres). The term rings will be used, but could also apply in addition to other structures, such as other circular structures or non-circular structures (e.g., squares, rectangles, polygons, etc.). Using the rings, the second clustering process may reduce the number of comparisons that are needed to generate the clusters. As will be discussed in more detail below, the second clustering process does not need to compare the distances for some objects that are outside of a number of rings that include the cluster of objects being analyzed.

System Overview

FIG. 1 depicts a simplified system 100 of a method for performing a clustering process according to some embodiments. A computing system 102 receives a set of objects for clustering. The set of objects may be associated with a company and may include business partners, products, articles, employees, or other objects that are stored in databases for the company. Clustering process selection logic 108 may analyze the objects to determine which of a first clustering process 104 and a second clustering process 106 should be used to generate clusters from the objects.

Clustering process selection logic 108 may compare the objects to a condition to select the clustering process to use. In some embodiments, a similarity measure is used to define the similarity between objects. The similarity measure may be based on characteristics of the objects that can be measured, such as the distance between objects is analyzed with respect to the set of objects. For example, clustering process selection logic 108 may analyze the distance between objects to determine whether or not the condition of triangular inequality is satisfied or not. The term distance may be used, but other similarity measures may be used. When the criterion is not met, then clustering process selection logic 108 selects the first clustering process 104. When the criterion is met, clustering process selection logic 108 selects second clustering process 106. Although the second clustering process is selected when the condition is met, in some embodiments, the first clustering process may be used whether or not the condition is met. However, in some embodiments, the second clustering process may determine the clusters faster than the first clustering process when processing the same set of objects. Also, the second clustering process may not be used when the condition is not met.

Depending on the clustering process selected, either of first clustering process 104 or second clustering process 106 may output the clusters for the objects. The clusters may cluster objects that have a value between them that is less than a distance, such as a radius of the cluster. Additionally, each cluster may include unique objects that are not included in other clusters. Thus, a cluster is a collection of objects that are similar to each other and that are dissimilar to objects belonging to other clusters. The similarity is defined by a distance value between the objects. The distance value may be any measurement associated with the objects, such as size, name, sales figures, or other characteristics. Two objects are similar if their distance is less than or equal to a given distance value. In other examples, two elements are similar if their distance is less than a given distance value (not including equal to). Two objects are not similar when their distance is greater than the given distance value. An element of a cluster that has a distance to every other element of the cluster that is equal or less than a given distance value is called representative of the cluster. Different distances or distance values may lead to different clustering. Also, although distance is described, other metrics may be used to determine the clusters.

Figure 2:
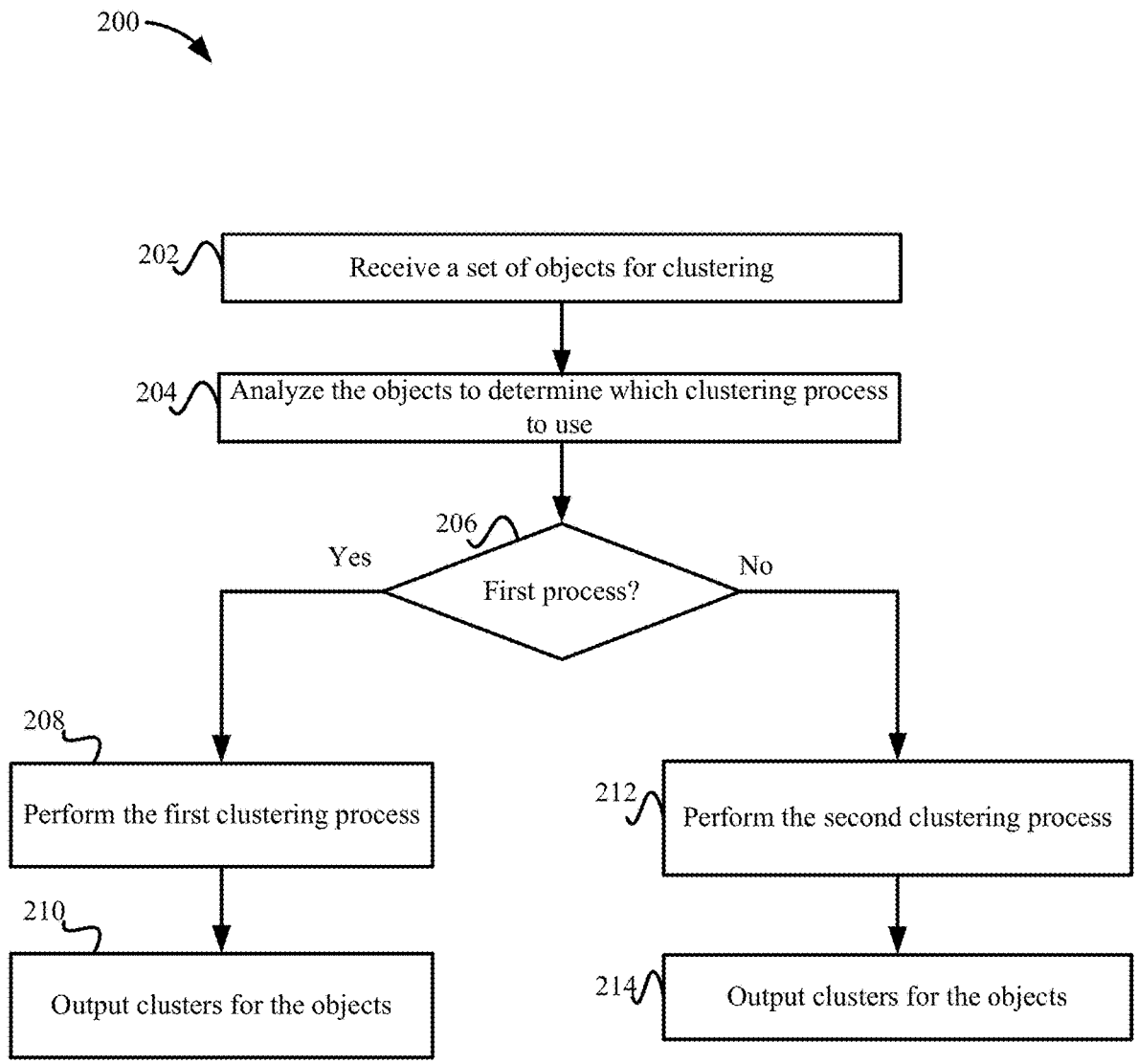
FIG. 2 depicts a simplified flowchart of a method for outputting clusters from a set of objects according to some embodiments.

FIG. 2 depicts a simplified flowchart 200 of a method for outputting clusters from a set of objects according to some embodiments. At 202, clustering process selection logic 108 receives a set of objects for clustering. Then, at 204, clustering process selection logic 108 analyzes the objects to determine which clustering process to use. For example, clustering process selection logic 108 selects either first clustering process 104 or second clustering process 106. Although these two clustering processes are described, other clustering processes may be selected from.

If a condition is satisfied, then at 208, first clustering process 104 performs the first clustering process. For example, an algorithm that compares the distance between all the objects is used to determine the clusters. Then, at 210, first clustering process 104 outputs clusters for the objects.

If the condition is not satisfied, then at 212, second clustering process 106 performs the second clustering process. The second clustering process may perform fewer comparisons than the first clustering process. Then, at 214, second clustering process 106 may output the clusters.

First Clustering Process

Figures 3A, 3B:
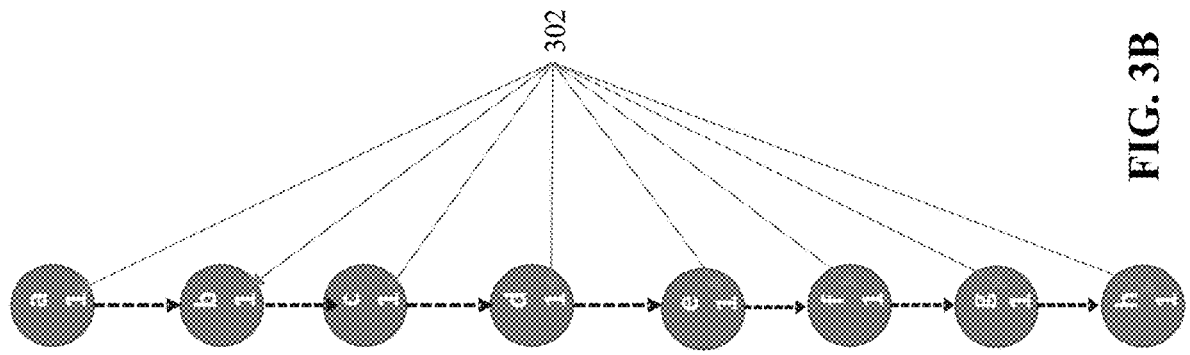

The following will describe first clustering process 104 and then second clustering process 106 will be described thereafter. FIG. 3A depicts a table 300 that lists objects and links between the objects according to some embodiments. Although a table is discussed, any type of data structure may be used. First clustering process 104 may analyze the objects received and generate table 300. In some embodiments, if a cluster has a radius r, first clustering process 104 analyzes a distance between objects to determine the values for entries into Table 300. In some embodiments, the following equation is used:

$$t_{i,j} = \begin{cases} 1 & \text{if } d(o_i, o_j) \leq r \\ 0 & \text{otherwise} \end{cases}$$

In the above, $t_{i,j}$ is a number and $o_i$, $o_j$ is a pair of objects. First clustering process 104 inserts an entry value of "1" if the distance between two objects is less than or equal to a distance value, which is represented by the radius r in the above equation. Otherwise, first clustering process 104 inserts a value of "0". The value of "1" indicates that two objects may be considered neighbors or possibly close to each other to be included in a cluster because their distance is less than a given distance value, such as radius r. Otherwise, the value of "0" indicates the objects are too far away to be considered part of the same cluster. The construction of the table $t_{i,j}$ is not necessary, but can be used.

For the entry for objects a and b, first clustering process 104 may compare the distance between these two objects. If the distance is less than the radius r, then first clustering process 104 inserts the value of "1" in this entry. The same is true for objects a and c, and a and d.

For the objects a and e, first clustering process 104 compares the distance between objects a and e and if this distance is greater than the radius r, then first clustering process 104 inserts the value of "0" in this entry. The same is true for objects a and f, a and g, and a and h. First clustering process 104 performs this analysis for each object to generate table 300.

First clustering process 104 may then analyze table 300 to generate the clusters. Before generating the clusters, first clustering process 104 generates link counts that will be used to generate the clusters faster than if the link counts were not used. FIGS. 3B to 3I illustrate a linking process between objects to generate link counts according to some embodiments. Then, FIGS. 4A to 4S illustrate the clustering process using the link counts according to some embodiments.

FIG. 3B depicts the initialization of the objects according to some embodiments. At 302, each of the objects is initialized as being linked to itself. The dotted arrows show an order of the objects.

Then, first clustering process 104 constructs links between the objects that are considered neighbors as illustrated as double-linked links. A neighbor is considered when an object is linked to another object. Although two arrows are used to indicate double-linked links, the two arrows indicate that the two objects are neighbors. In the process, first clustering process 104 starts with object "a" and creates double links between objects in the upper row of table 300 (e.g., objects b to h) if and only if object "a" is a neighbor with the current considered object. The neighbor is when the distance between the two objects is less than a radius r if and only if the corresponding value is "1" in the table $t_{i,j}$. For every creation of a link, first clustering process 104 increases the link count for both objects by "1". First clustering process 104 may store the link count for all objects in another table (not shown). The above procedure is then repeated for each individual object, such as object "b", then object "c", and so on. First clustering process 104 may then consider the object a in the top row and creates double links between objects in the left vertical column of table 300 (e.g., objects b to h) if and only if object "a" is a neighbor with the current considered object and a link was not previously created from the first analysis.

Figure 3G:
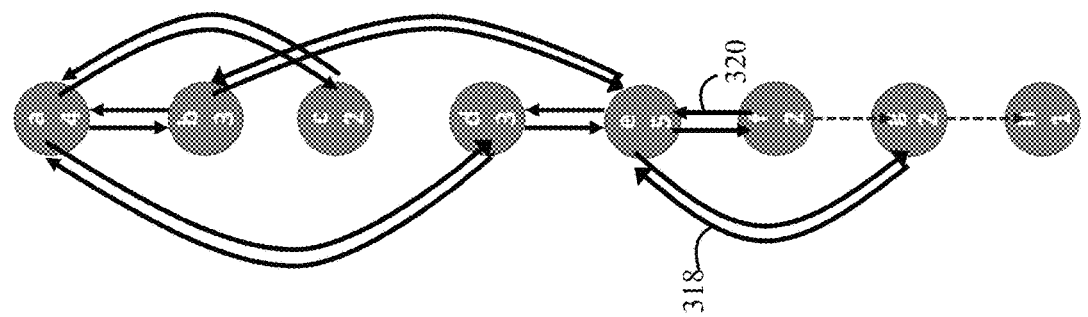
Figure 3F:
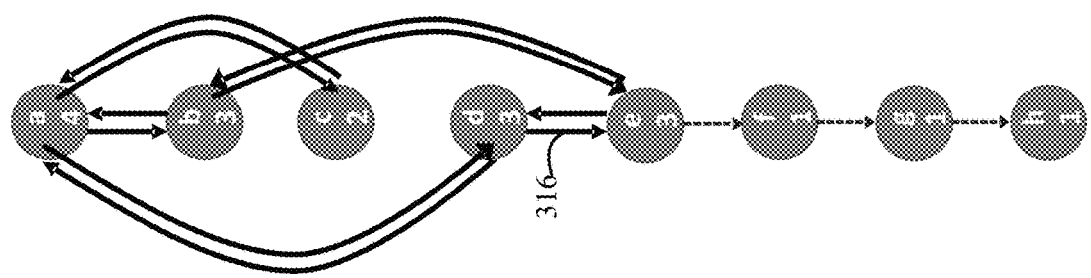
Figure 3E:
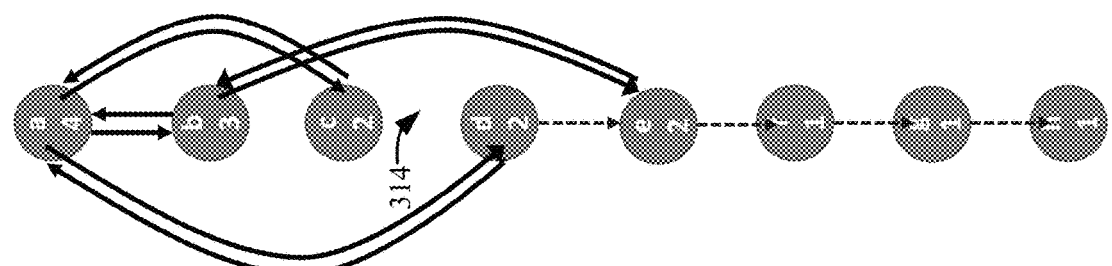
Figure 3D:
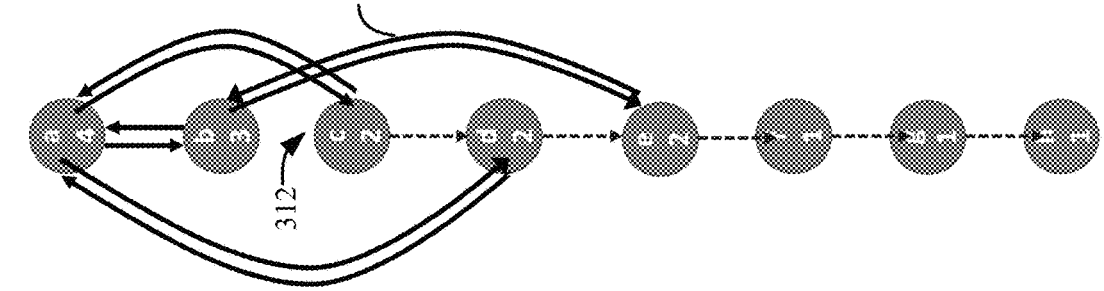
Figure 3C:
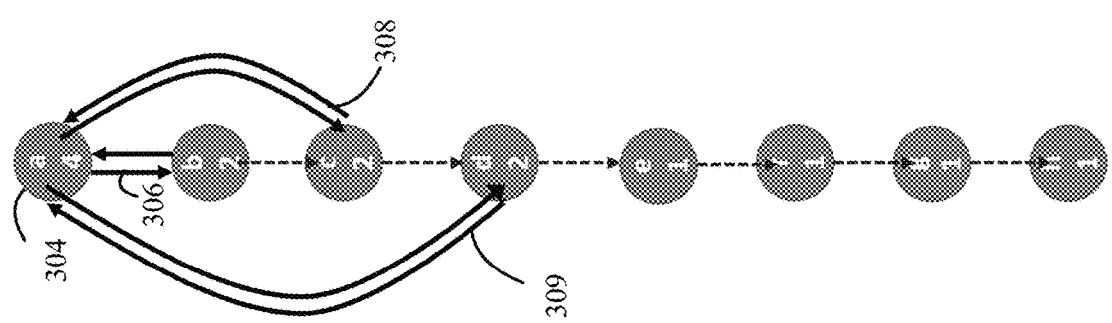

FIG. 3C depicts an example for considering object a according to some embodiments. At 304, first clustering process 104 considers object a. In table 300, object a is considered neighbors with objects a, b, c, and d. At 306, first clustering process 104 adds a link to object b. Additionally, at 308, first clustering process 104 adds a link to object c. Further, at 309, first clustering process 104 adds a link to object d. First clustering process 104 increases the link count based on the number of links generated between objects. For example, the link count is increased for both objects in which a link is created. For example, object a is linked to four objects: a, b, c, and d, and first clustering process 104 creates a link count of "4" for object a. Object b is linked to object a and first clustering process 104 increases the link count to "2" for object b. Similarly, object c is linked to object a and first clustering process 104 increases object c's link count to "2".

FIG. 3D processes object b according to some embodiments. First clustering process 104 analyzes table 300 to determine that object b is neighbors with object e due to table 300 including the value of "1" in entries for the objects b and e. At 310, first clustering process 104 adds a link to object e. First clustering process 104 increases the link count for object b to "3" and object e to "2". Also, at 312, first clustering process 104 removes the initial link between object b and object c because these two objects are not linked together.

FIG. 3E processes object c according to some embodiments. First clustering process 104 reviews table 300 to determine that object c is not neighbors with any other objects. In this case, at 314, first clustering process 104 removes the link between object c and object d because no link exists between object c and object d. No new links are then created.

FIG. 3F shows the processing of object d according to some embodiments. First clustering process 104 reviews table 300 to determine that object d is neighbors with object e. At 316, first clustering process 104 creates a link between object d and object e and also increases the link count for object d and object e to "3".

FIG. 3G shows the processing of object e according to some embodiments. First clustering process 104 reviews table 300 to determine that object e is neighbors with objects d, f, and g. First clustering process 104 creates two new links between object e and object g at 318 and object e and object f at 320. First clustering process 104 also increases the link count for object e from "3" to "5", and the link count of object f to "2" and the link count of object g to "2".

FIG. 3H depicts the processing of object f according to some embodiments. First clustering process 104 reviews table 300 to determine that object f is neighbors with objects e, g, and h. First clustering process 104 creates two new links between object f and object g and object f and object h at 322 and 324, respectively. Also, first clustering process 104 increases the link count of object f to "4", object g to "3", and object h to "2".

FIG. 3I depicts the processing of object g and object h according to some embodiments. In table 300, first clustering process 104 determines that object g is neighbors with objects e, f, and h and that object h is neighbors with objects f, and g. Only one new link needs to be created between objects g and h at 326. All other links have already been created. First clustering process 104 then increases the link count for object g to "4" and the link count for object h to "3".

At this point, first clustering process 104 has created all the links between objects and generated the link counts for all objects. Now, first clustering process 104 can perform the clustering of the objects using the link counts.

FIGS. 4A to 4S describe the clustering process according to some embodiments. FIG. 4A selects an object with the highest link count according to some embodiments. In this example, at 402, first clustering process 104 selects object e, which has a link count of "5 that is higher than any other link count for any other objects. First clustering process 104 then defines a new cluster with objects that are linked to object e. In this example, first clustering process 104 may analyze table 300 to determine that a cluster #1 is objects e, b, d, f, and g, which are all linked to object e.

After creating the new cluster, first clustering process 104 then updates the link counts. For example, for every neighbor x of the selected object the first clustering process 104 proceeds as follows: first clustering process 104 finds every neighbor y of neighbor x and decreases the number of neighbors of neighbor y (and also of neighbor x, although it is not necessary) by one. After having considered all neighbors of neighbor x, first clustering process 104 removes object x from the double-linked links (e.g., data structure). When the link count is decreased, first clustering process 104 decreases the link count in the link count data structure.

The following will describe the process in more detail. FIG. 4B shows an example of processing object d according to some embodiments. Object d is linked to object e. Then, first clustering process 104 determines objects that are linked to object d. For example, at 404, object a is linked to object d. Then, first clustering process 104 decreases the link count for object a to "3" and the link count for object d to "2".

FIG. 4C shows the processing of object e according to some embodiments. At 408, first clustering process 104 selects object e. Object e is linked to object d and first clustering process 104 decreases the link count for object e to "4". The link count for object d could be decreased, but the object will be deleted. The link count could be used as a check to see if all neighbors have been checked as the number of neighbors should be "1". Then, because all objects linked to object d have been processed, FIG. 4D shows the deletion of object d at 410, according to some embodiments.

FIG. 4E shows the processing of object b according to some embodiments. At 412, object b is linked to object e. Then, first clustering process 104 processes the linked objects to object b. At 414, object a is linked to object b, and first clustering process 104 reduces the link count for object a to "2". Also, first clustering process 104 decreases the link count for object b to "2". Object e is also linked to object b and FIG. 4F shows the processing of object e according to some embodiments. First clustering process 104 reduces the link count for object e to "3" and the link count for object b to "1" at 416. When all linked objects to object b have been processed, FIG. 4G shows the deletion of object b at 418 according to some embodiments.

FIG. 4H shows the processing of object g according to some embodiments. At 420, first clustering process 104 determines the linked objects to object g. For example, object f at 422 is linked to object g and first clustering process 104 reduces the link count for object f and object g to "3". FIG. 4I shows the processing of object h according to some embodiments. At 424, first clustering process 104 determines that object h is linked to object g and clustering process 104 reduces the link count to "2" for object h. Then, at 426, respectively, first clustering process 104 reduces the link count to "2" for object g.

Object e is also linked to object g. FIG. 4J shows the processing of object e according to some embodiments. At 428, first clustering process 104 reduces the link count of object g to "1" and at 430, first clustering process 104 reduces the link count of object e to "2". When all linked objects have been considered for object g, FIG. 4K shows the deletion of object g at 432 according to some embodiments.

First clustering process 104 then considers object f. FIG. 4L shows the processing of object f according to some embodiments. At 434, first clustering process 104 determines that object h is linked to object f. Then, first clustering process 104 decreases the link count of object h to "1" and the link count of object f to "2" at 436. Then, object e is also linked to object f. FIG. 4M shows the processing of object e according to some embodiments. At 438, first clustering process 104 decreases the link count for object e to "1" and at 440, decreases the link count of object f to "1". All objects associated with object f have been processed and FIG. 4N shows the deletion of object f at 442 according to some embodiments.

All the linked objects to object e have now been processed and FIG. 4O shows the deletion of object e at 444. Then, first clustering process 104 selects another object that has the highest link count. The above processing of the links was needed to update the link counts such that the clustering process could continue with the remaining nodes. First clustering process 104 selects object c because object c has a link count of "2". It is noted object a has the same link count. In some embodiments, if objects have the same link count, first clustering process 104 may arbitrarily select an object. That is, object a could be selected also.

FIG. 4P shows the selection of the next object for process according to some embodiments. At 446, first clustering process 104 selects object c. Then, first clustering process 104 creates a new cluster #2 including the objects linked to object c, which includes object a and object c. FIG. 4Q shows the processing of object a according to some embodiments. First clustering process 104 determines that object a is linked to object c. At 448, first clustering process 104 reduces the link count for object a to "1" and the link count for object c to "1" at 450. All links for object a have been processed and FIG. 4R shows the deletion of object a at 552 according to some embodiments. All objects for object c have been now processed and FIG. 4S shows deletion of object c at 554 according to some embodiments.

Thereafter, first clustering process 104 selects the next object with the highest link count. In this example, only object h is left from the set of objects and first clustering process 104 selects object h. First clustering process 104 then creates a new cluster #3 and includes object h. There are no linked objects to object h and first clustering process 104 then deletes object h.

After performing the above processing, first clustering process 104 determines that cluster #1 includes objects e, b, d, f, and g; cluster #2 includes objects a and c; and cluster #3 includes object h. The above process analyzed the distance between all of the objects due to the distances between objects not meeting the triangular inequality condition, and thus first clustering process 104 was used. Even so, the use of the neighborhood table 300 and the link counts improve the process of determining the clusters. Additionally, the process of selecting the object with the highest link count first improves the processing because the clustering is performed efficiently when considering all links to objects.

Second Clustering Process

Second clustering process 106 may perform a clustering process that reduces the number of comparisons between objects compared to if first clustering process 104 is used. For example, second clustering process 106 may not compare the distances between every single object in a set of objects.

FIG. 5 depicts a set of objects 500 according to some embodiments. The objects are depicted as dots on a graph. Distances between the objects are represented between the dots. The dots may represent various values for objects for a company, such as products, business partners, etc. Although the dots are represented on a two dimensional plane, the objects may be in a three dimensional or higher plane. FIGS. 6 to 54 depict the second clustering process according to some embodiments.

Second clustering process 106 may order the set of objects with respect to a selected object. FIG. 6 shows an example of a selected object 602 according to some embodiments. In some embodiments, selected object 602 may be selected arbitrarily. In other embodiments, selected object 602 may be selected to maximize a number of rings that are generated as will be discussed below. In some embodiments, selected object 602 is selected that is within or near the center of the objects. If an object farther from the center is selected, then more rings may be needed to encompass all the objects.

Figure 7:
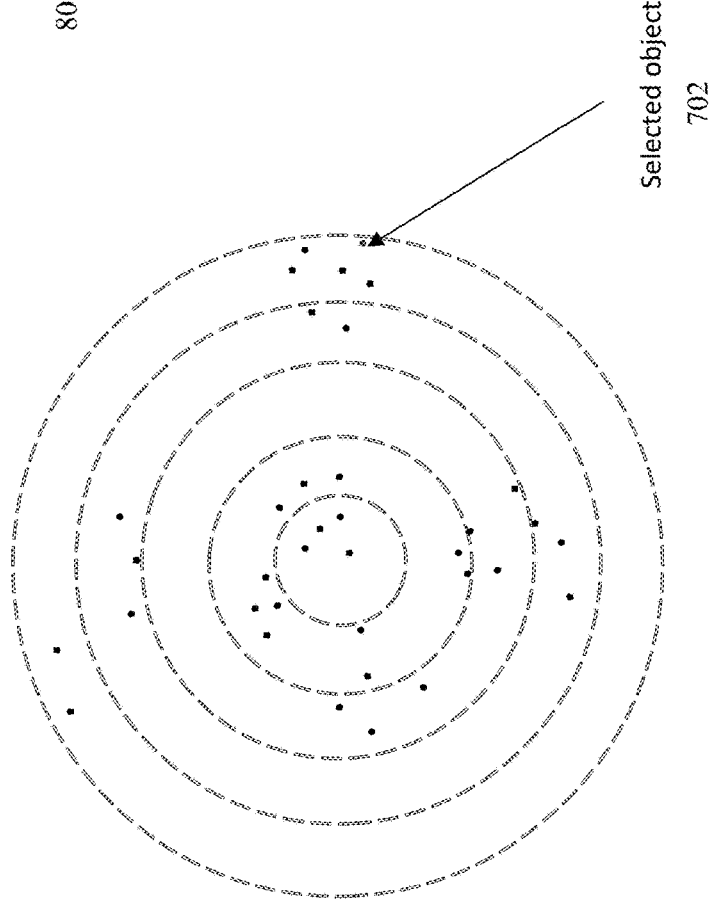

Then, second clustering process 106 selects another object that is a maximal distance from the selected object 602. FIG. 7 shows an example of a selected object 702 that is a maximal distance from selected object 602 according to some embodiments. Selected object 702 is used to generate structures using a distance, such as rings or spheres using the distance. By the choice of the object 702 having the maximal distance from object 602, second clustering process 106 attempts to generate a number of the created rings that is largest.

The neighborhood of an object x is the set of all objects having a distance at most the value r from object x. Since the distance of every object from itself is zero, the neighborhood of object x contains object x as well. For every object x and its neighborhood "N", the enriched neighborhood of object x is those neighborhood of an element from neighborhood "N", having the maximal cardinality (e.g., number of elements of a set) and containing the whole neighborhood "N". Every enriched neighborhood defines a cluster in some clustering.

Figure 8:
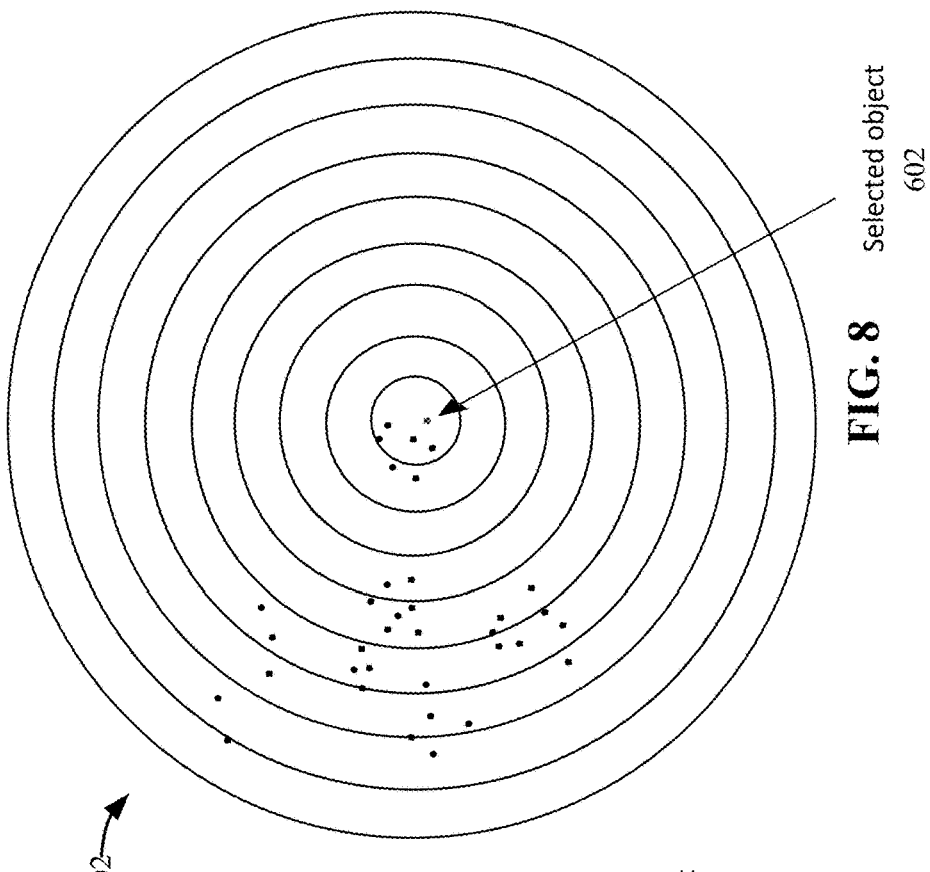

FIG. 8 shows an example of rings 802 according to some embodiments. Second clustering process 106 may generate rings 802 with a center of selected object 602. Rings 802 may have a size that is based on a distance value, such as a radius that is a multiple of a distance r. For example, each ring 802 may have a radius that is a multiple of r, such as r, 2r, 3r, and so on until every object is contained in some ring.

After creating the rings, second clustering process 106 then selects a cluster according to some embodiments. FIG. 9 depicts an example of selecting a cluster using an enriched neighborhood according to some embodiments. Second clustering process 106 may use a concept of the enriched neighborhood to define the cluster. The enriched neighborhood may include objects in the cluster that may be outside of a smallest ring that includes selected object 602 (e.g., neighborhood of the selected object 602), but the enriched neighborhood may only include objects within the two rings closest to selected object 602. To generate the enriched neighborhood, first, second clustering process 106 selects ring 902, which is a first eligible ring (e.g., smallest) that has selected object 602 in the center. Within ring 902, some objects are shown as being included within a radius r. These objects may form part of the cluster. However, second clustering process 106 also calculates an enriched neighborhood 904. Since the distance satisfies the triangle inequality, an enriched neighborhood of the selected object 908 cannot contain objects outside of the second ring 906. Second ring 906 is a ring that is one ring greater than ring 902, such as if ring 904 has a radius of r, ring 906 has a radius of 2r. Determination of the enriched neighborhood is needed because in contrast to the enriched neighborhood of an object, the neighborhood of an object is not necessarily a cluster in some clustering. That is, the ring may not have the first selected object as the center, but rather have another selected object as the center of the ring. Using the enriched neighborhood of the selected object 602 means that second clustering process 106 does not need to consider and compare objects outside the second ring.

Second clustering process 106 determines the enriched neighborhood by selecting objects within ring 902 and generating a ring with each selected object as the center. In order to do so, second clustering process 106 selects every element after the other from the ring 902 and finds the distances between it and every object within ring 902 and ring 906. By using these distances second clustering process 106 constructs the neighborhood of the selected element. From all constructed neighborhoods second clustering process 106 selects one of them having the maximal cardinality and fully containing the ring 902 (which is the neighborhood of the selected object 602).

Since the distance satisfies the triangle inequality, second clustering process 106 can determine the enriched neighborhood for a cluster without performing comparisons for objects that are outside of ring 906. The enriched neighborhood of selected object 602 in FIG. 9 is a neighborhood "N" of an object of ring 902, having the maximal cardinality and fully containing ring 906 (which is the neighborhood of the selected object) 602. Since every neighbor of every object of object 902 has a distance at most "r" and since the distance satisfies the triangle inequality, all objects outside ring 906 have a distance higher than the distance r and therefore cannot belong to the enriched neighborhood of selected object 602 and be in its cluster. This reduces the number of comparisons that second clustering process 106 needs to perform and also increases the speed at which second clustering process 106 can determine the clusters. Further, performing fewer comparisons may reduce the computing resources used to determine the clusters and generate the clusters faster than if all objects were compared.

After determining the first cluster, second clustering process 106 removes the objects within the enriched neighborhood 904. FIG. 10 shows the removal of the objects within enriched neighborhood 904 according to some embodiments.

Figure 12:
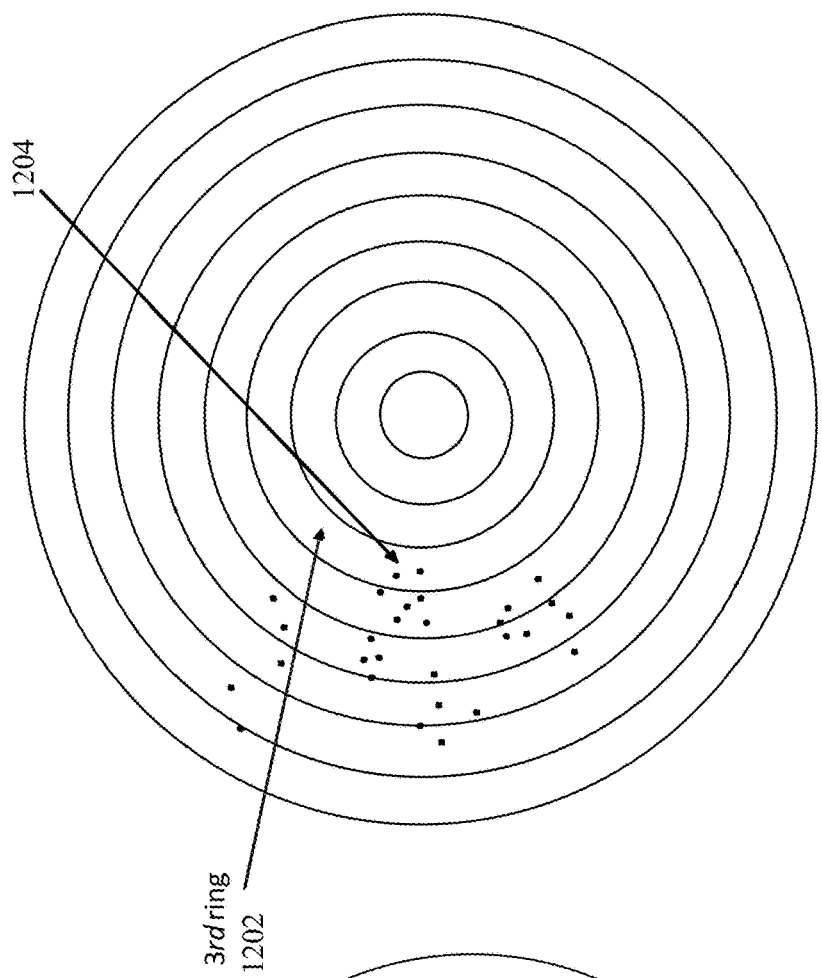
Figure 11:
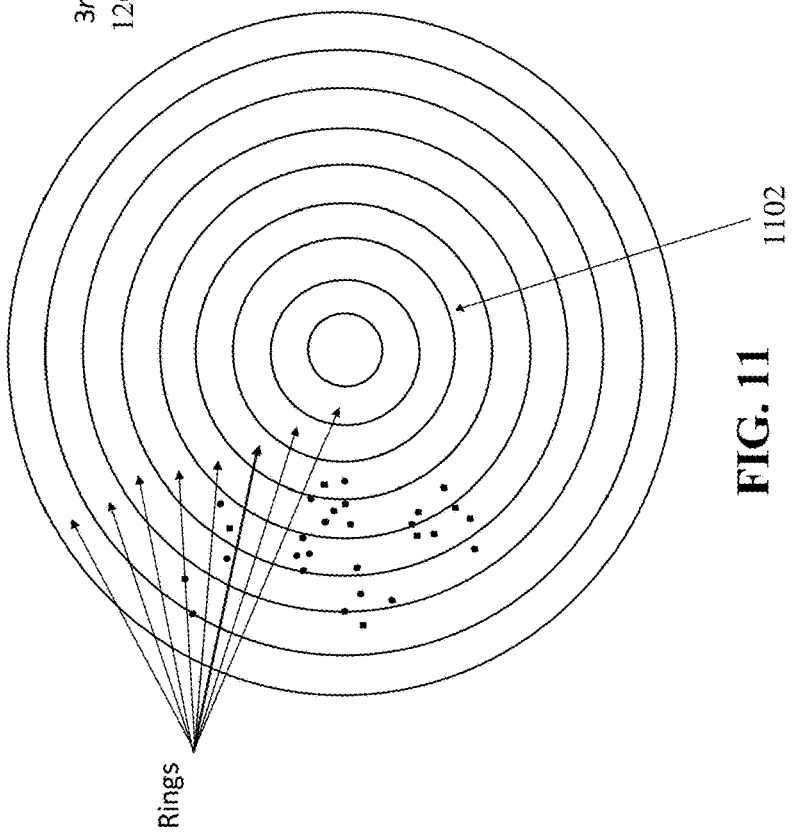

Second clustering process 106 then determines if the first of the concentric ring includes some objects after removing the objects of the cluster. FIG. 11 depicts an example of remaining rings according to some embodiments. In some examples, the first ring does not include any objects. It is noted that the inner ring is the 0 ring, the ring outside the 0 ring is the first ring, and then the second ring is included. Also, no objects exist within the second ring shown at 1102. However, objects exist within the third ring. FIG. 12 depicts an example of selecting a third ring 1202 according to some embodiments. At 1204, two objects within the third ring 1202 are shown.

Second clustering process 106 then performs a similar analysis as discussed above to form another cluster using objects 1204 in the third ring 1202. FIG. 13 depicts an example of determining a second set of rings according to some embodiments. Second clustering process 106 selects an object 1302 within third ring 1306. Then, second clustering process 106 considers the already created rings one after the other and creates clusters for the currently considered ring. After the construction of a cluster, second clustering process 106 removes objects of the cluster from the rings. Second clustering process 106 considers the objects within the current considered ring and the next two rings. In FIG. 13, the rings 1306, 1308 and 1310 are considered. Second clustering process 106 selects object 1302 and constructs nested spheres with radius r, 2r, 3r, and so on until every object within the rings 1306, 1308 and 1310 is contained in some sphere. In FIG. 13 only four spheres are necessary. These spheres will help to create the clusters containing the objects of the current ring 1306 faster because enriched neighborhoods are created using the spheres.

Second clustering process 106 then creates the next cluster, which is the enriched neighborhood of the selected object 1302. Since the distance satisfies the triangle inequality, every object of the cluster belongs to one of the three rings 1306, 1308 and 1310.

FIG. 14 shows an example of an enriched neighborhood 1402 for the cluster. Second clustering process 106 performs the same process as discussed above in FIG. 9 to determine the enriched neighborhood cluster at 1402. The enriched neighborhood cluster includes selected objects from first ring 1306 and second ring 1308. Also, objects from third ring 1310 can be included in the enriched neighborhood.

Figure 15:
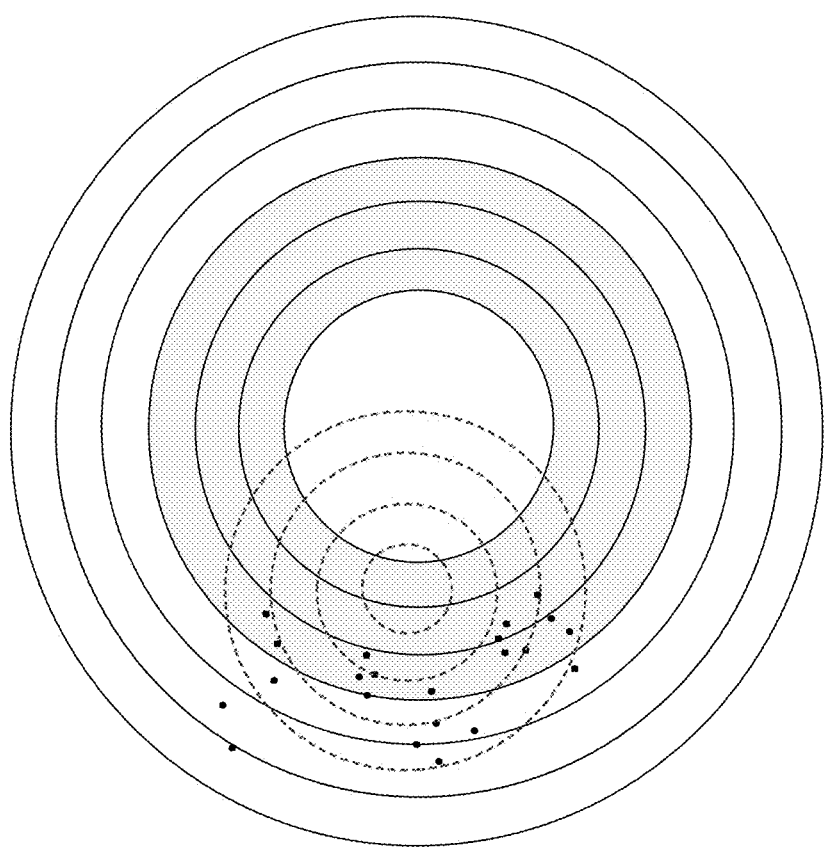

After defining the second cluster, FIG. 15 shows the removal of objects in the second cluster according to some embodiments.

The clustering process then continues with the next ring 1308, since the current ring 1306 is empty after removing the objects of the last cluster. FIG. 15 demonstrates the current empty ring according to some embodiments.

Second clustering process 106 continues with the next nonempty ring i=4. FIG. 16 shows an example of the fourth nonempty ring according to some embodiments. The fourth nonempty ring i=4 is shown at 2302. Then, second clustering process 106 selects an object o from the fourth nonempty ring i=4. FIG. 17 shows an example of a selected object and associated rings according to some embodiments. The selected object is shown at 2402. Then, second clustering process 106 determines a new second set of rings 2404 with selected object 2402 at the center of those rings. This process is similar to as described above with respect to FIG. 13.

Figure 19:
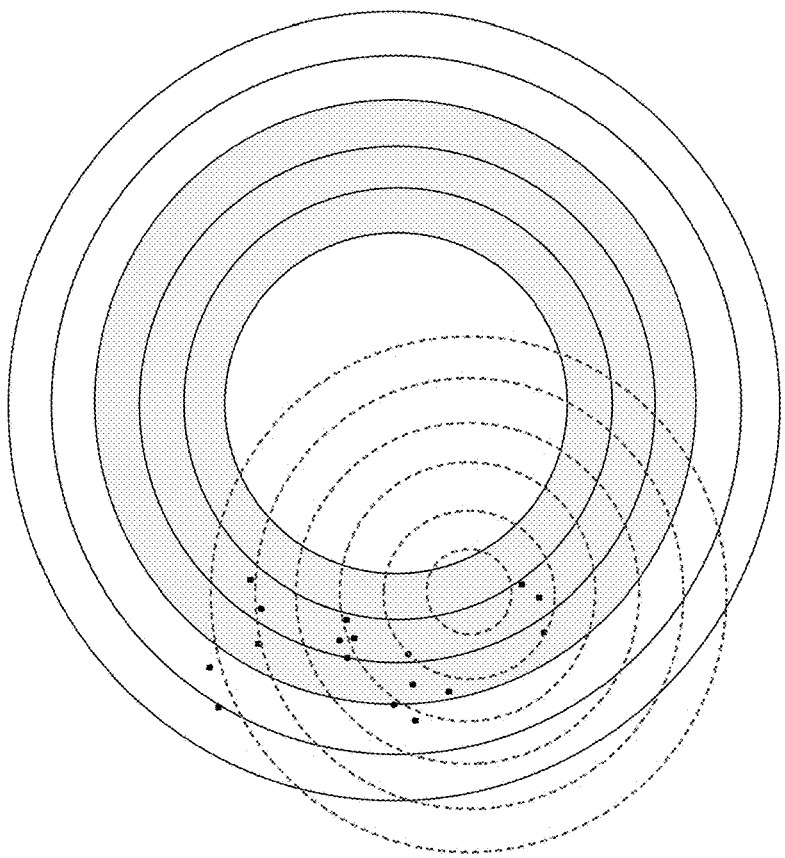
Figure 18:
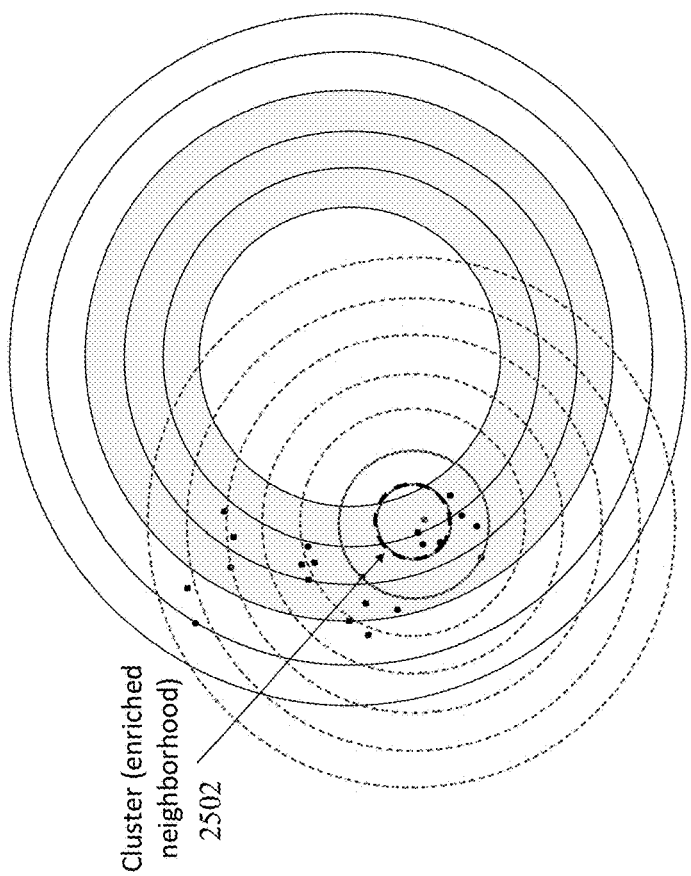

Second clustering process 106 then determines the enriched neighborhood again. FIG. 18 shows an example of determining an enriched neighborhood according to some embodiments. In this example, the enriched neighborhood of the selected object 2402 is the same as its neighborhood. The cluster with the enriched neighborhood is shown at 2502. This includes the objects within the first two rings from rings 2404. Once the enriched neighborhood is determined, second clustering process 106 removes the objects from the enriched neighborhood cluster. FIG. 19 shows the removal of the objects.

Figure 20:
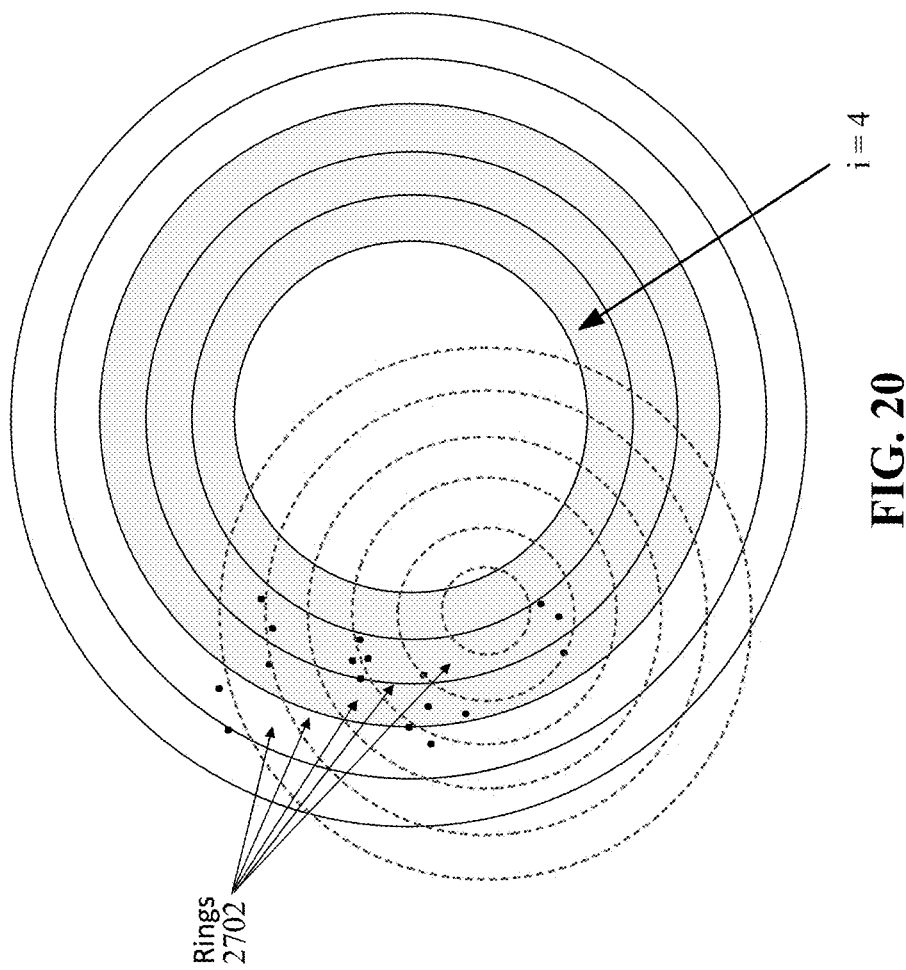

The clustering process then continues with the next non-empty ring, since the current ring i=4 is empty after removing the objects of the last cluster. FIG. 20 demonstrates the current empty ring according to some embodiments.

Accordingly, second clustering process 106 continues with ring i=5. FIG. 21 depicts an example of the processing of the next non-empty ring i=5 according to some embodiments. Next, second clustering process 106 selects an object in ring i=5. FIG. 22 depicts an example of the selected object according to some embodiments. Second clustering process 106 may select an object within ring i=5 and generate a new second set of rings around the selected object at 3004.

As discussed above, the process continues to select a cluster with an enriched neighborhood. FIG. 23 shows an example of generating a cluster with an enriched neighborhood at 3102 according to some embodiments. Then, as discussed above, after generating the cluster, FIG. 24 shows the removal of the objects in the enriched neighborhood for the cluster according to some embodiments.

FIG. 25 shows analyzing rings 3302 to determine an intersection between rings 3302 and ring i=5 according to some embodiments. Since after removing the last cluster the current considered ring 5 is not empty, second clustering process 106 creates clusters for the remaining objects of the current ring, before it proceeds with the next nonempty ring. Then, second clustering process 106 defines segments $M_{i,j}$ as the intersection between ring i and ring j, where i is one of the three rings 5, 6, 7 and ring j one of the rings 3302 shown in FIG. 25.

FIG. 26 shows the objects that are included in the ring j=1 according to some embodiments. At 3402, objects within the ring j=1 are shown. Some of these objects are included in ring i=5. FIG. 27 shows an example of the objects that are included in ring i=5 that are included in the second set of rings 3202 according to some embodiments. At 3502, the objects that intersect ring j=1 and ring i=5 (e.g., $M_{5,1}$) are shown.

Second clustering process 106 then selects objects from the intersecting sections of the current ring i=5 with the rings 3202. For every selected object, second clustering process 106 creates an enriched neighborhood of the selected object, which is a new cluster. Process 106 starts its selections first with the objects from the intersecting section $M_{i,1}$, then with $M_{i,2}$, then with section $M_{i,3}$, and so on, until every object of the current ring i belongs to some created cluster. FIG. 28 shows an example of the selected object at 3602 from the section $M_{5,1}$ according to some embodiments. Then, second clustering process 106 creates an enriched neighborhood of the selected object 3602. In order to realize this, second clustering process 106 does not need to find all distances between object 3602 and all objects from the three rings 5, 6 and 7. Since the distance satisfies the triangle inequality, it is enough to compare a selected object from section $M_{i,j}$ only with the objects from the sections $M5_{,1}$, $M_{5,2}$, $M_{5,3}$, $M_{6,1}$, $M_{6,2}$, $M_{6,3}$, $M_{7,1}$, $M_{7,2}$' and $M_{7,3}$. As shown in FIG. 27, all objects outside these sections have a distance from the selected object at least 2r. Therefore second clustering process 106 builds a new third set of rings with the center at the selected object 3602 with radii r, 2r, 3r, and so on at 3604 until every element from the intersecting sections $M5_{,1}$, $M_{5,2}$, $M_{5,3}$, $M_{6,1}$, $M_{6,2}$, $M_{6,3}$, $M_{7,1}$, $M_{7,2}$' and $M_{7,3}$ is contained in some ring.

Figures 29, 30:
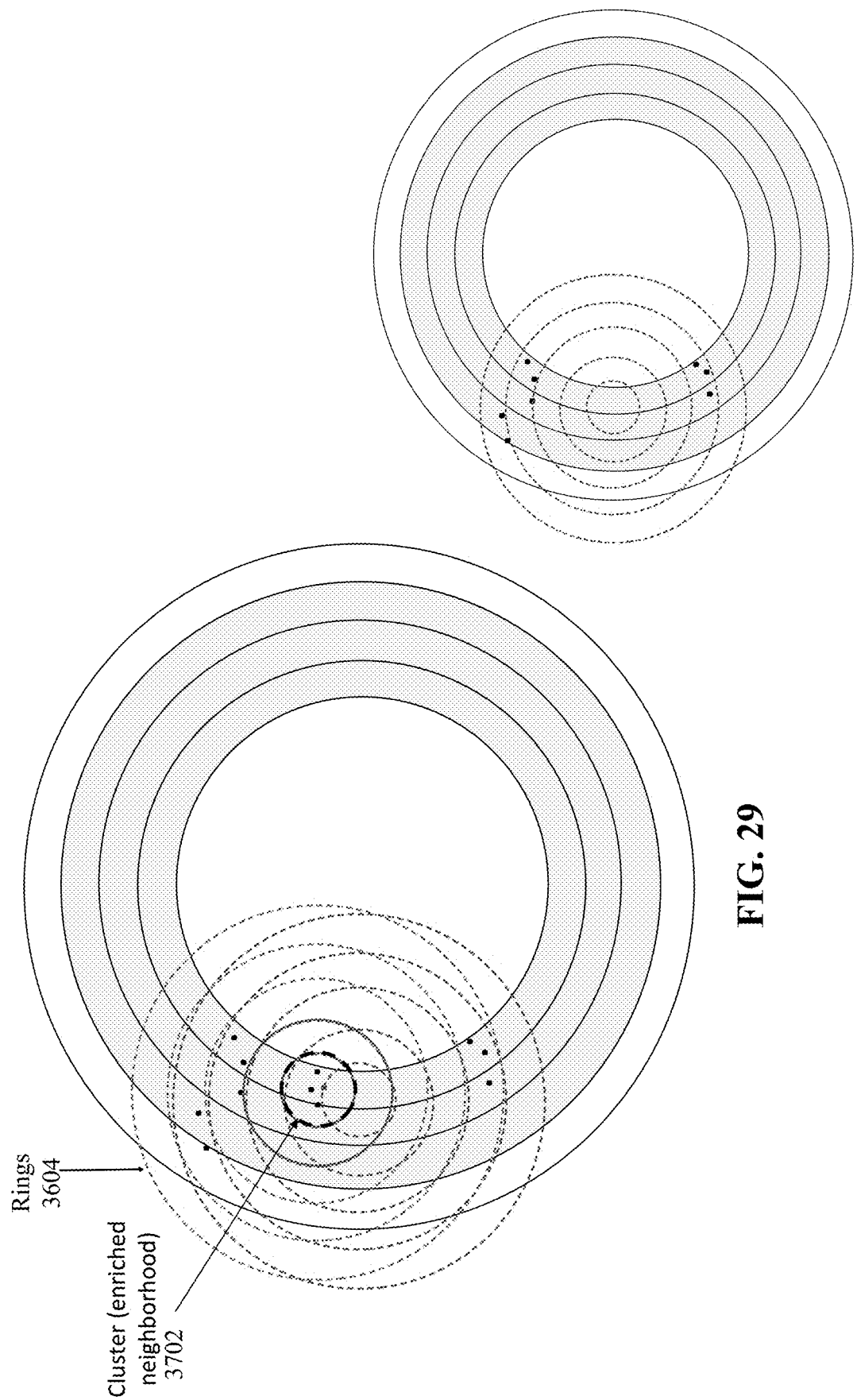

FIG. 29 shows an enriched neighborhood for a cluster according to some embodiments. Second clustering process 106 then determines a cluster within an enriched neighborhood at 3702 using rings 3604. Second clustering process 106 then removes the objects from the cluster. FIG. 30 shows the removal of the objects according to some embodiments.

Figure 31:
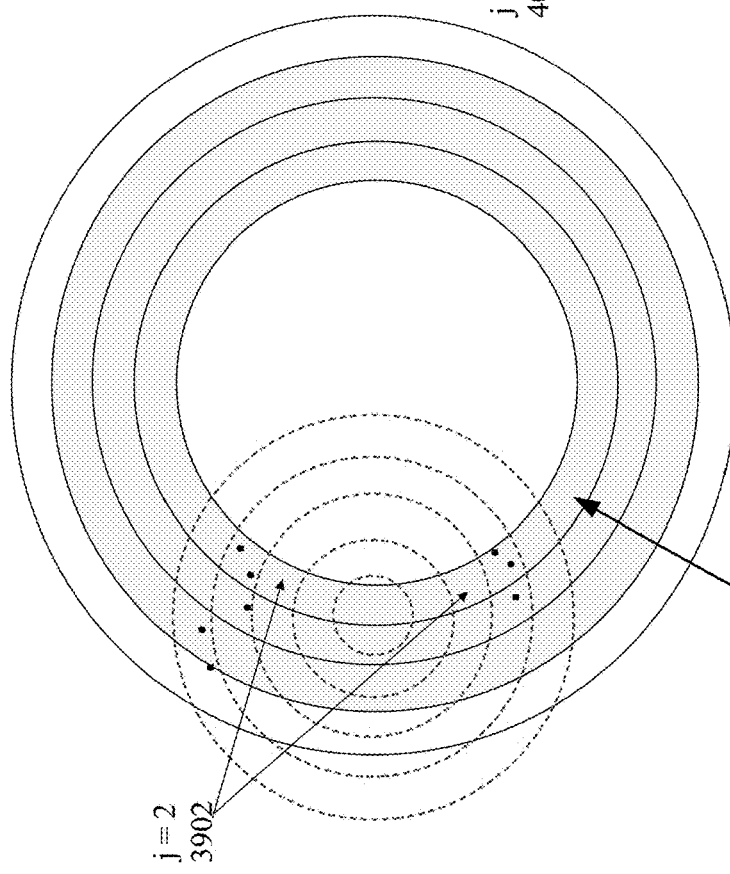

Since section $M_{5,1}$ is empty, second clustering process 106 analyzes section $M_{5,2}$ next. FIG. 31 shows an example of analyzing section $M_{5,2}$ according to some embodiments. At 3902, second clustering process 106 determines that the intersecting section $M_{5,2}$ is empty.

Figure 32:
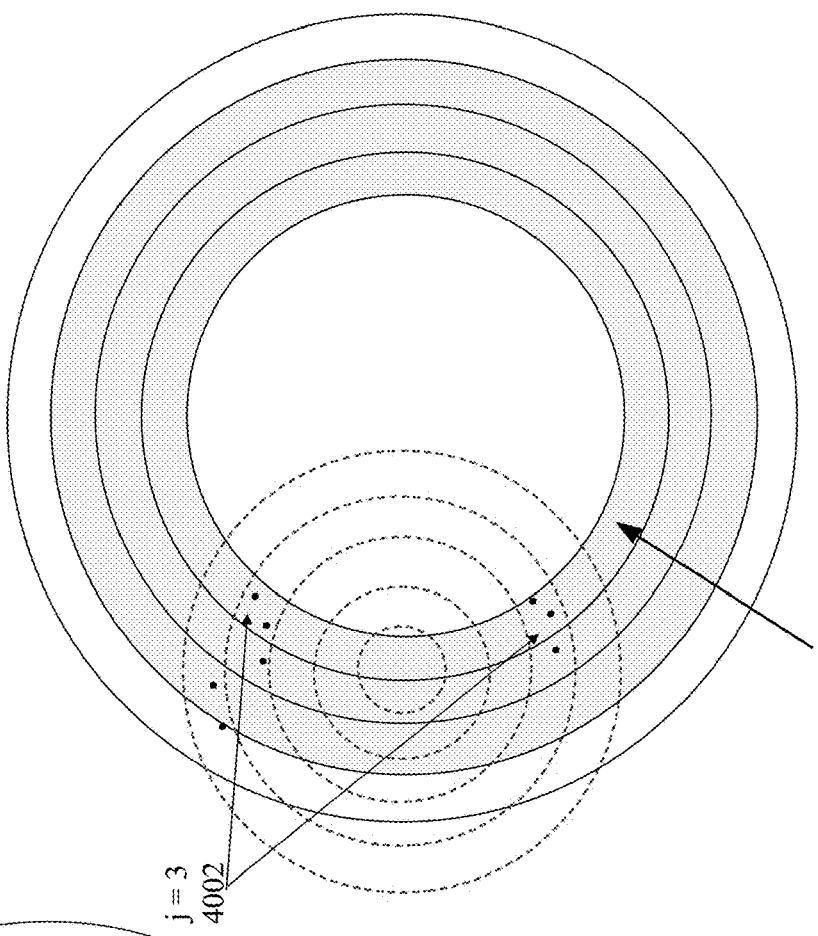
Figure 35:
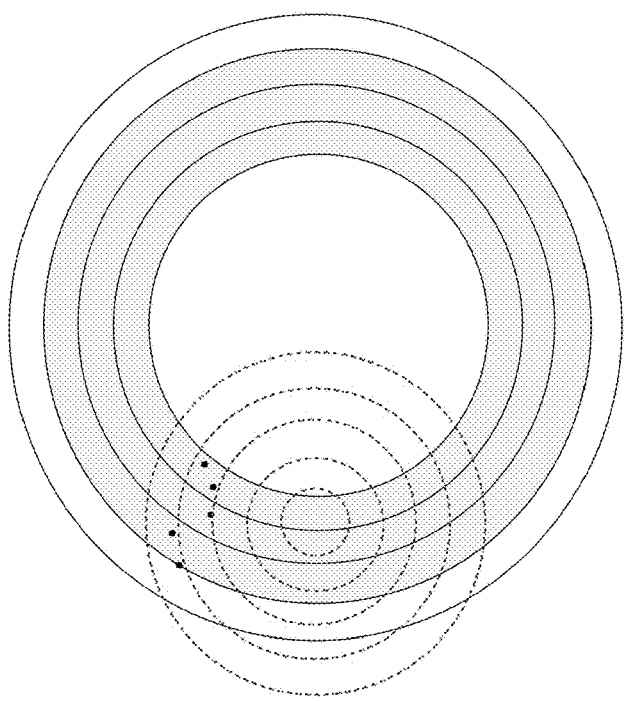

Second clustering process 106 then moves to ring j=3. FIG. 32 shows an example of analyzing ring j=3 according to some embodiments. Second clustering process 106 determines that intersecting section $M_{5,3}$ includes objects at 4002. Second clustering process 106 then selects an object from the intersecting section $M_{5,3}$. FIG. 33 shows an example of selecting an object according to some embodiments. Second clustering process 106 may select an object as shown at 4102 from the intersecting section $M_{5,3}$. Then, second clustering process 106 builds a third set of rings 4104 around selected object 4102. FIG. 34 shows a cluster of an enriched neighborhood according to some embodiments. Second clustering process 106 then selects a cluster using an enriched neighborhood at 4204 using rings 4104. FIG. 35 shows the removal of the objects from the cluster using the enriched neighborhood.

Figure 36:
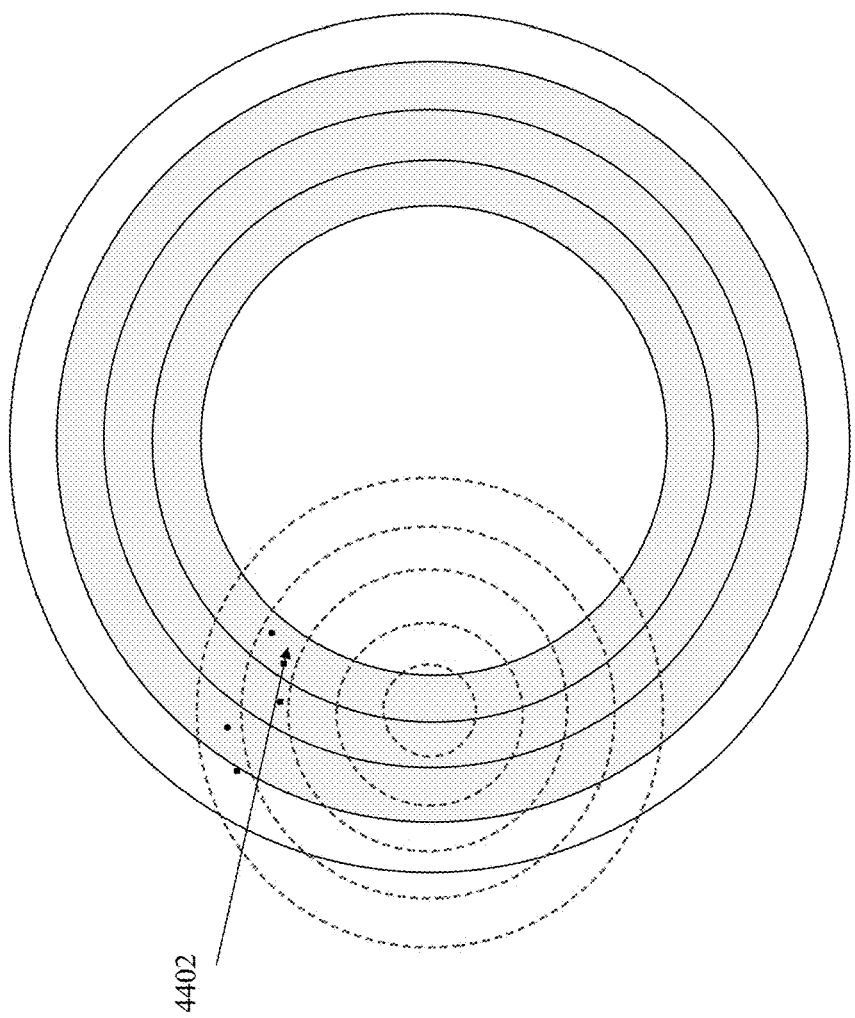
Figure 37:
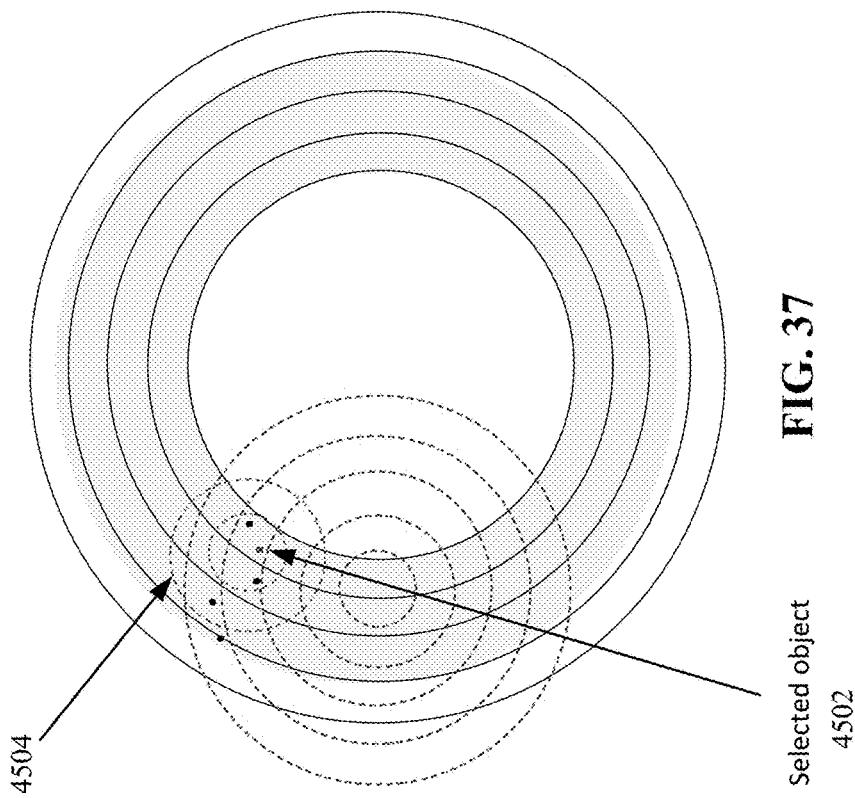

FIG. 36 shows intersecting section $M_{5,3}$ according to some embodiments. At 4402, second clustering process 106 determines that intersecting section $M_{5,3}$ is not empty. Then, FIG. 37 depicts a selected object in the intersecting areas according to some embodiments. At 4502, second clustering process 106 has selected an object at 4502 and builds rings around the selected object at 4504.

Figure 38:
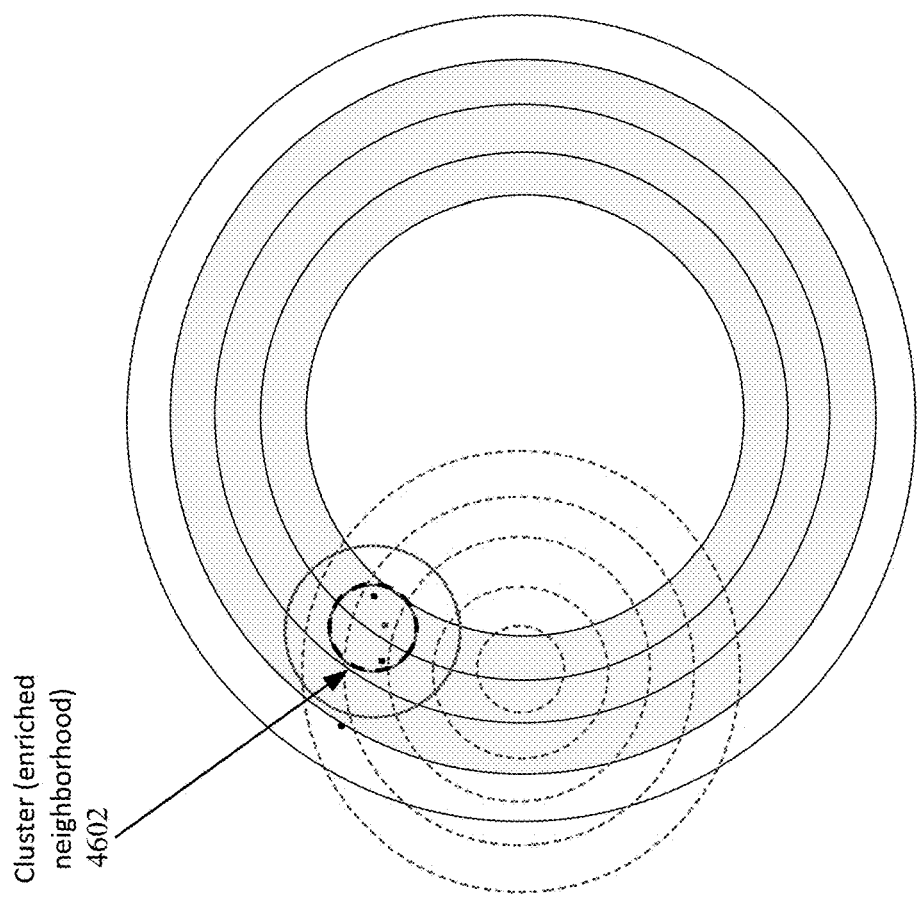
Figure 39:
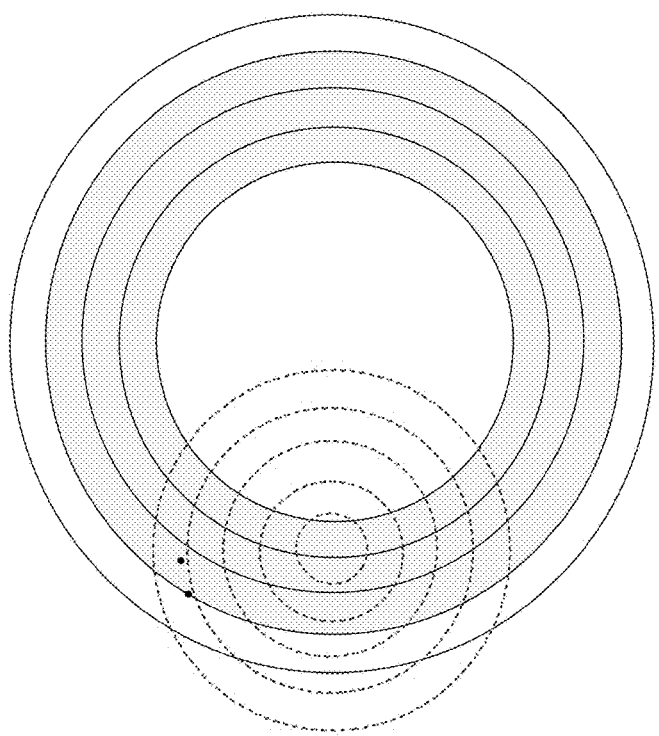

FIG. 38 shows a cluster in an enriched neighborhood according to some embodiments. Second clustering process 106 selects a cluster in an enriched neighborhood at 4602 using rings 4504. FIG. 39 shows the removal of the objects from the cluster according to some embodiments.

Figure 40:
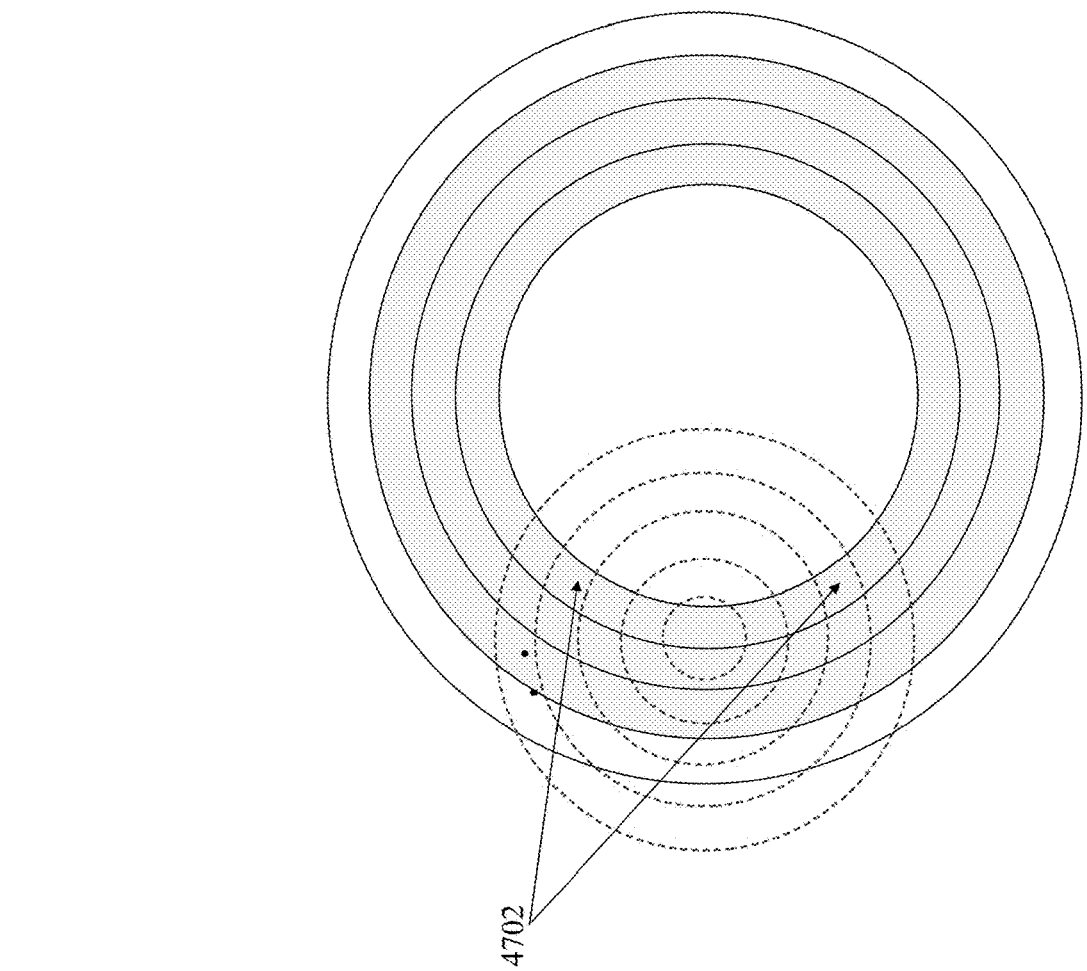

FIG. 40 shows an analysis of intersecting section $M_{5,4}$ according to some embodiments. FIG. 41 shows the intersecting section $M_{5,4}$ according to some embodiments. At 4902, second clustering process 106 determines that intersecting section $M_{5,4}$ is empty.

Figure 42:
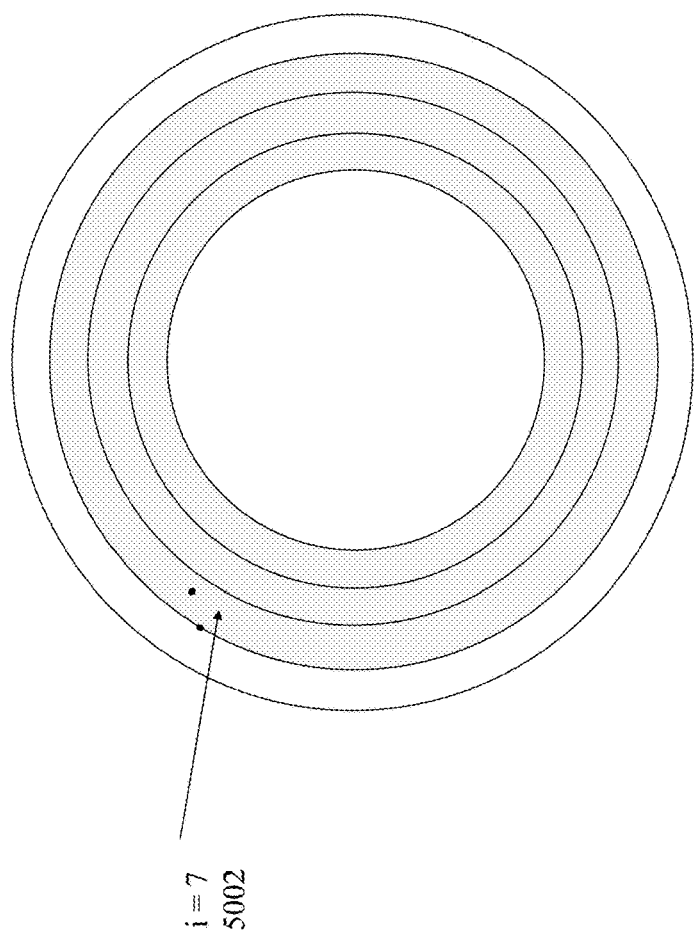

Second clustering process 106 then continues with the next ring that is not empty. FIG. 42 depicts an example of ring i=7 at 5002 according to some embodiments. Second clustering process 106 skips ring i=6 because it does not include any objects.

Figure 43:
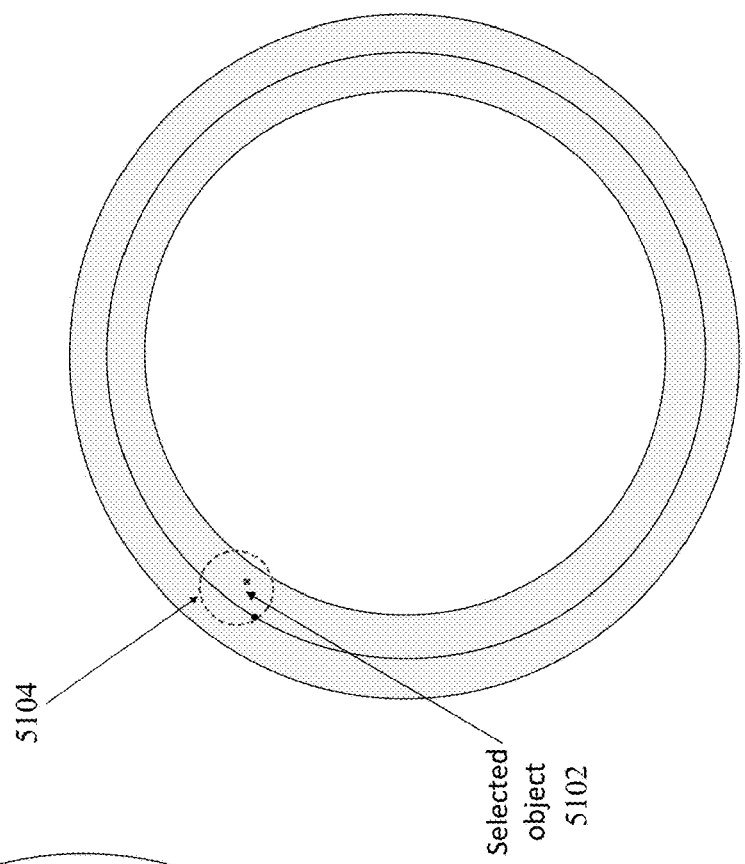

FIG. 43 depicts an example of selecting an object in ring i=7 according to some embodiments. Second clustering process 106 selects an object in ring i=7 at 5102. Second clustering process 106 also generates a ring with a radius r around the selected object at 5104.

Figure 45:
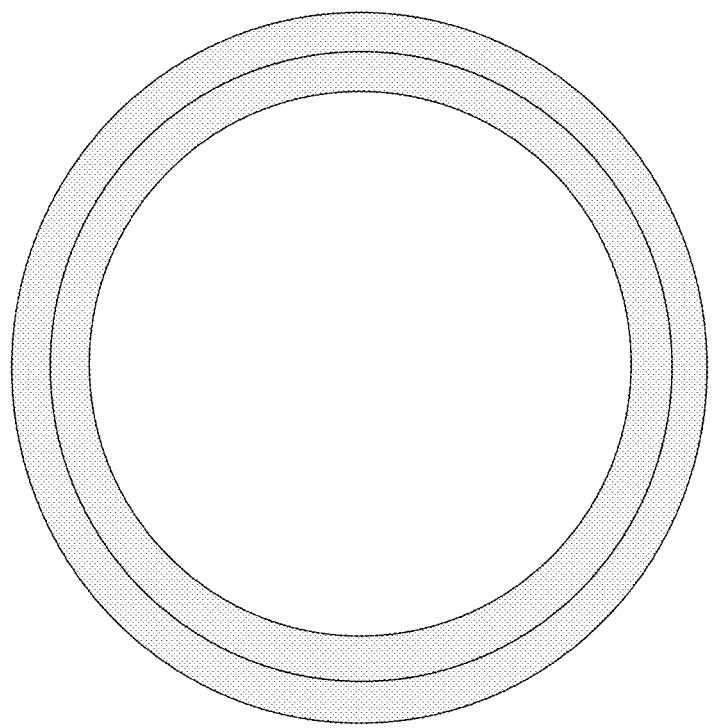
Figure 44:
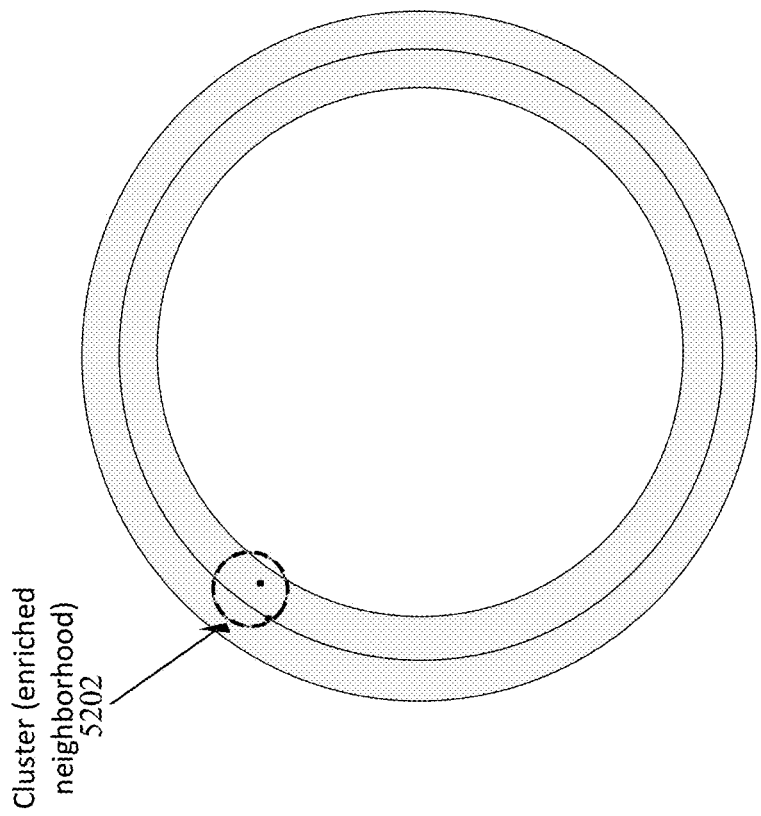

FIG. 44 shows an example of a cluster within an enriched neighborhood according to some embodiments. Second clustering process 106 determines the cluster within the enriched neighborhood at 5202. FIG. 45 removes the objects from the enriched neighborhood according to some embodiments. At this point, all objects have been classified into clusters.

Figure 46:
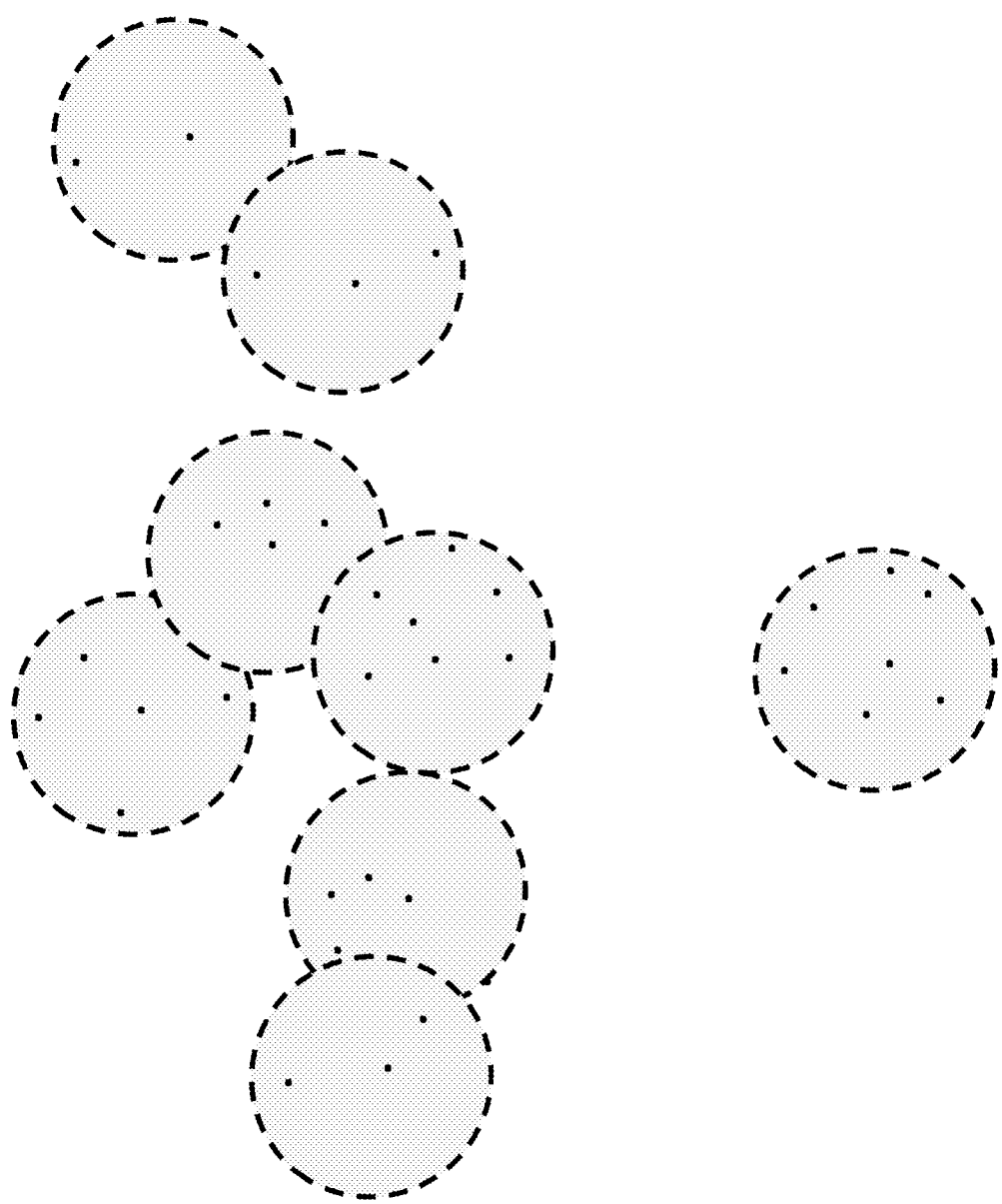

FIG. 46 shows an example of the clusters according to some embodiments. Each cluster has a radius of r. Some of the rings around the clusters may overlap; however, no objects within a cluster are a member of another cluster.

Figure 47:
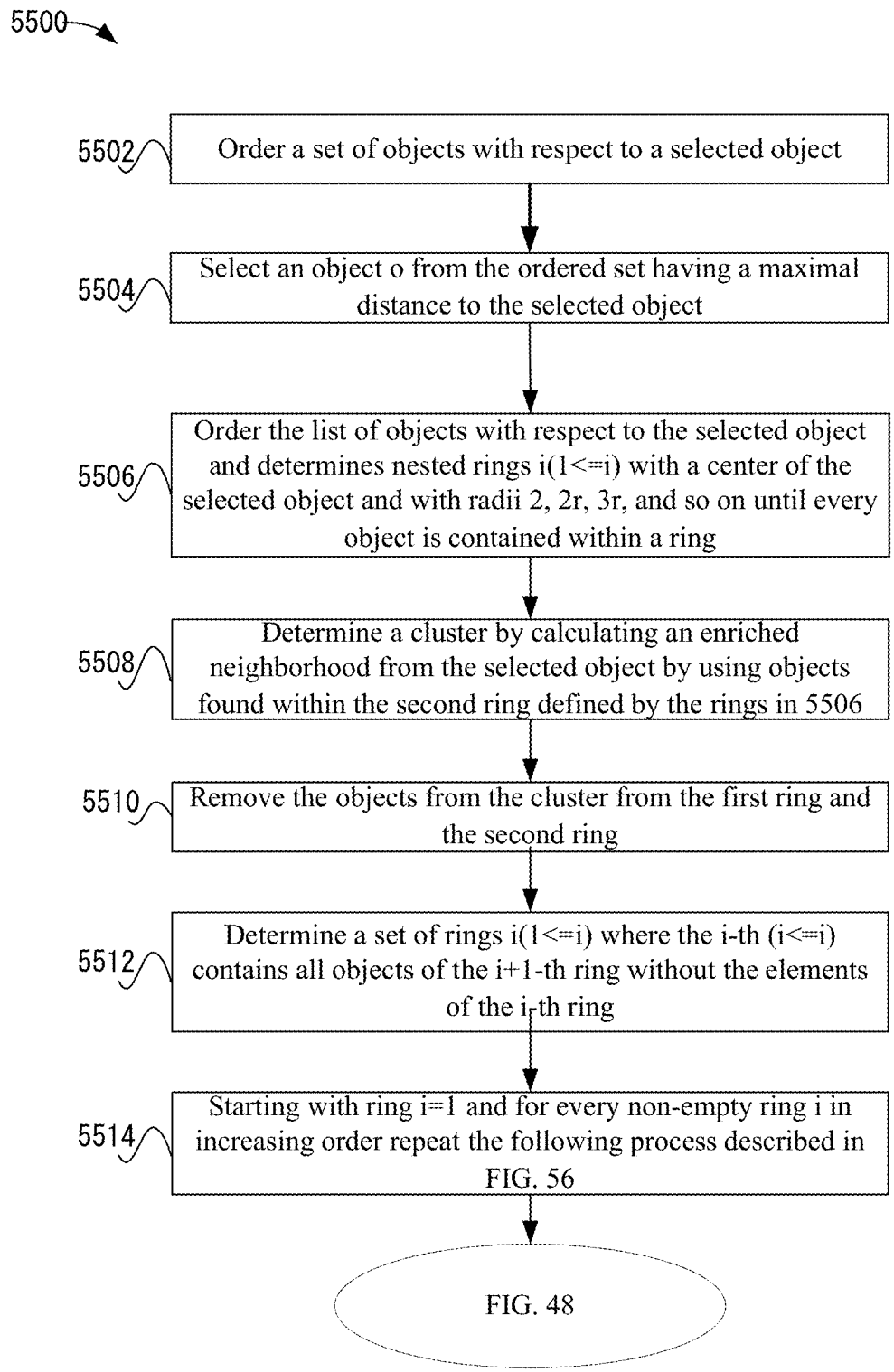
FIG. 47 depicts a simplified flowchart of a method for selecting clusters according to some embodiments.

Second clustering process 106 may perform the above process using the following method flows. FIG. 47 depicts a simplified flowchart 5500 of a method for selecting clusters according to some embodiments. At 5502, second clustering process 106 orders a set of objects with respect to a selected object. At 5504, second clustering process 106 selects an object o from the ordered set having a maximal distance to the selected object.

At 5506, second clustering process 106 orders the list of objects with respect to the selected object and determines nested rings i($1<=i$) with a center of the selected object and with radii 2, 2r, 3r, and so on until every object is contained within a ring. In this way second clustering process 106 attempts to generate a large number of rings. The term $1<=i$ means at least one.

At 5508, second clustering process 106 determines a cluster by calculating an enriched neighborhood from the selected object by using objects found within the second ring defined by the rings in 5506. At 5510, second clustering process 106 removes the objects from the cluster from the first ring and the second ring.

At 5512, second clustering process 106 determines a set of rings i($1<=i$) where the i-th ($i<=i$) contains all objects of the i+1-th ring without the elements of the i-th ring.

Figure 48:
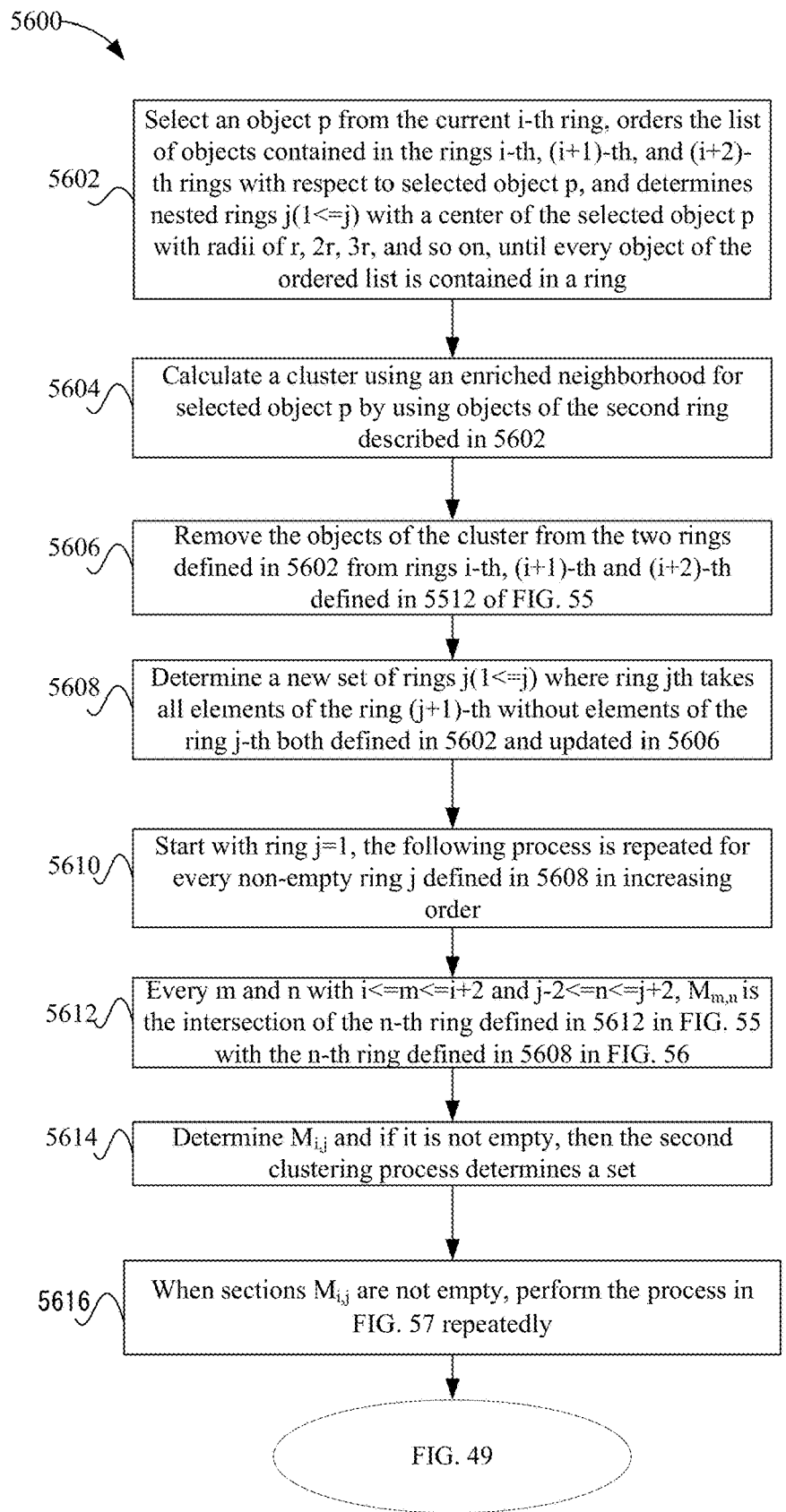
FIG. 48 depicts the repeating process to determine clusters according to some embodiments.

At 5514, starting with ring i=1 and for every non-empty ring i in increasing order repeat the following process described in FIG. 48.

FIG. 48 depicts the repeating process to determine clusters according to some embodiments. At 5602, second clustering process 106 selects an object p from the current i-th ring, orders the list of objects contained in the rings i-th, (i+1)-th, and (i+2)-th rings with respect to selected object p, and determines nested rings j($1<=j$) with a center of the selected object p with radii of r, 2r, 3r, and so on, until every object of the ordered list is contained in a ring.

At 5604, second clustering process 106 calculates a cluster using an enriched neighborhood for selected object p by using objects of the second ring described in 5602. At 5606, second clustering process 106 removes the objects of the cluster from the two rings defined in 5602 from rings i-th, (i+1)-th and (i+2)-th defined in 5512 of FIG. 47.

At 5608, second clustering process 106 determines a new set of rings j($1<=j$) where ring jth takes all elements of the ring (j+1)-th without elements of the ring j-th both defined in 5602 and updated in 5606.

At 5610, starting with ring j=1, the following process is repeated for every non-empty ring j defined in 5608 in increasing order. At 5612, every m and n with $i<=m<=i+2$ and $j-2<=n<=j+2$, $M_{m,n}$ is the intersection of the n-th ring defined in 5512 in FIG. 55 with the n-th ring defined in 5608 in FIG. 48. At 5614, second clustering process 106 determines $M_{i,j}$ and if it is not empty, then second clustering process 106 determines a set $M=\cup_{i \le m \le i+2, \, j-2 \le n \le j+2}$. This determines the intersecting areas between ring i and ring j and determines the objects within the intersecting sections if the sections are not empty.

Figure 49:
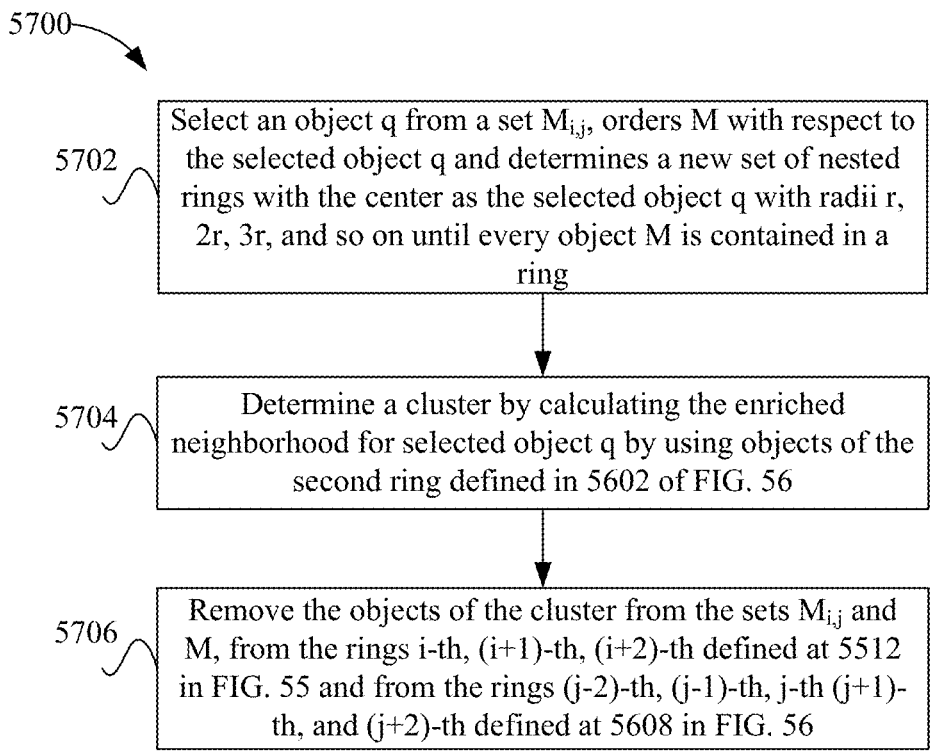
FIG. 49 depicts a method for determining additional clusters according to some embodiments.

At 5616, when sections $M_{i,j}$ are not empty, the following process is repeated in FIG. 49. FIG. 49 depicts a method for determining additional clusters according to some embodiments. At 5702, second clustering process 106 selects an object q from a set $M_{i,j}$, orders M with respect to the selected object q and determines a new set of nested rings with the center as the selected object q with radii r, 2r, 3r, and so on until every object M is contained in a ring.

At 5704, second clustering process 106 determines a cluster by calculating the enriched neighborhood for selected object q by using objects of the second ring defined in 5602 of FIG. 48.

At 5706, second clustering process 106 removes the objects of the cluster from the sets and M, from the rings i-th, (i+1)-th, (i+2)-th defined at 5512 in FIG. 47 and from the rings (j−2)-th, (j−1)-th, j-th (j+1)-th, and (j+2)-th defined at 5608 in FIG. 48.

The following summarizes the above process:

1. Order the set of objects with respect to some selected object
2. Select an object o from the ordered set having the maximal distance to the selected object
3. Order the list of objects with respect to the selected object o and determine nested spheres i ($1 \le i$) with center the selected object o, and with radiuses r, 2r, 3r and so on until every object is contained in some sphere
4. Determine a cluster by calculating an enriched neighborhood from object o by using the objects of the second sphere defined in step 3
5. Remove the objects of cluster from the first pair of spheres 6. Determine a set of rings i (1≤i), where i-th ring (1≤i) contains all objects of the i+1-th sphere without the elements of the i-th sphere
7. Starting with i=1 and for every nonempty ring i in increasing order repeat:
   i. Select an object o' from the current i-th ring, order the list of objects contained in the i-th, (i+1)-th and (i+2)-th rings with respect to o', and determine a set of nested spheres j (1≤j) with center o' and with radiuses r, 2r, 3r and so on until every object of the ordering list is contained in some sphere
   ii. Determine a cluster by calculating an enriched neighborhood of o' by using the objects of the second sphere defined in sub-step i
   iii. Remove the objects of the cluster from the first two spheres defined in step i and from the i-th, (i+1)-th and (i+2)-th rings defined in step 6
   iv. Determine a new set of rings j (1≤j), where j-th ring contains all elements of the (j+1)-th sphere without the elements of the j-th sphere both
      defined in sub-step i and updated in sub-step iii
   v. Starting with j=1 repeat for every nonempty ring j defined in sub-step iv in increasing order:
      /* Let for every m and n with i≤m≤i+2 and j−2≤n≤j+2 $M_{m,n}$ be the intersection of the m-th ring defined in step 6 with n-th ring defined in step iv
      a. Determine $M_{i,j}$ and if it is not empty then determine set $M = \cup_{i \le m \le i+2,\ j-2 \le n \le j+2} M_{m,n}$
      b. While $M_{ii}$ is not empty repeat:
         (1) Select an object o" from the set $M_{i,j}$, order M with the respect to the selected object o", and determine a new set of nested spheres with center
         the selected object o" and with radiuses r, 2r, 3r and so on until every object of M is contained in some sphere
         (2) Determine a cluster by calculating the enriched neighborhood of object o" by using the objects of the second sphere defined in sub-step (1)
         (3) Remove the objects of the cluster from the sets $M_{i,j}$ and M, from the i-th, (i+1)-th, (i+2)-th rings defined in step 6 and from the (j−2)-th, (j−1)-th, j-th, (j+1)-th, and (j+2)-th rings defined in step iv

EXAMPLES

In a first example, the distance is n=10 and every product is assigned to a characteristic "sales figure level" (from 1 to 20) describing how strong the sales figure of the product is. Hence objects $o_i=(l_i)$, where $l_i$ is its sales figure level. FIG. 50 depicts a table 5800 of the objects and sales figure levels according to some embodiments.

The company wants to cluster the products according to their sales figure level. Since a cluster only contains "similar" products and the similarity depends on the observer, the company has to define both, the "similarity" between two products and the size of the cluster. This can be done by defining a distance between the products (with respect to the sales figure level) and by defining the radius of the cluster. One way is to define the distance between two products $o_i$, $o_j$, 1≤i,j≤10, by $d(o_i, o_j)=|l_i-l_j|$ (but other definitions are possible, too). The smaller the distance the more similar are the products $o_i$ and $o_j$.

Figure 51:
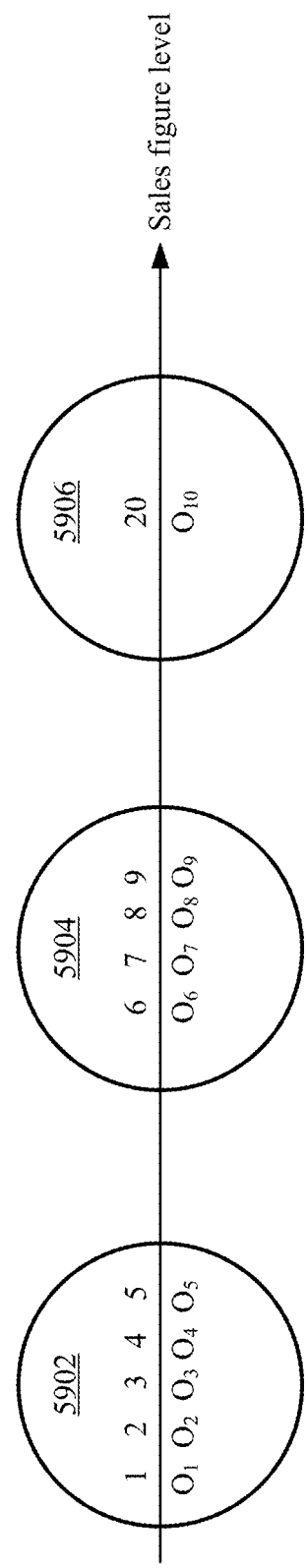
FIG. 51 depicts clusters for the products according to some embodiments.

The radius can be defined by a positive numbers, such as 2. The smaller the radius the finer the clustering. Every product $o_i$ can be represented in the 1-dimensional space by $o_i=(l_i)$, where $l_i$ is its sales figure level. The first or second clustering process may be used based on the conditions defined above. First clustering process 104 or second clustering process 106 place the products on an axis of "sales figure level" and generate clusters. FIG. 51 depicts clusters for the products according to some embodiments. A first cluster 5902 contains the products $o_1, o_2, o_3, o_4, o_5$, a second cluster 5904 contains the products $o_6, o_7, o_8, o_9$ and a third cluster 5906 contains the product $o_{10}$.

In a second example, the number of products is n=10 and every product is assigned to the characteristics "sales figure level" (from 1 to 20) and "cost level" (from 1 to 10, describing how high are the costs of the product). Hence the product $o_i=(l_i, l'_i)$, where $l_i$ is its sales figure level and $l'_i$ its costs level. The company wants to cluster the products according to their sales figure level and to their cost level. FIG. 52 depicts a table 6000 of the objects, sales figure levels, and cost levels according to some embodiments.

As in the first example, the company defines the "similarity" between two products and defines the radius of the cluster. In some embodiments, the company defines the distance between two products $o_i$, $o_j$, 1≤i,j≤10, by $d(o_i, o_j)=|l_i-l_j|+|l'_i-l'_j|$ and the radius of the cluster is defined by 2. The smaller this distance the more similar the products $o_i$ and $o_j$. Also, the smaller the radius the finer the clustering.

Figure 53:
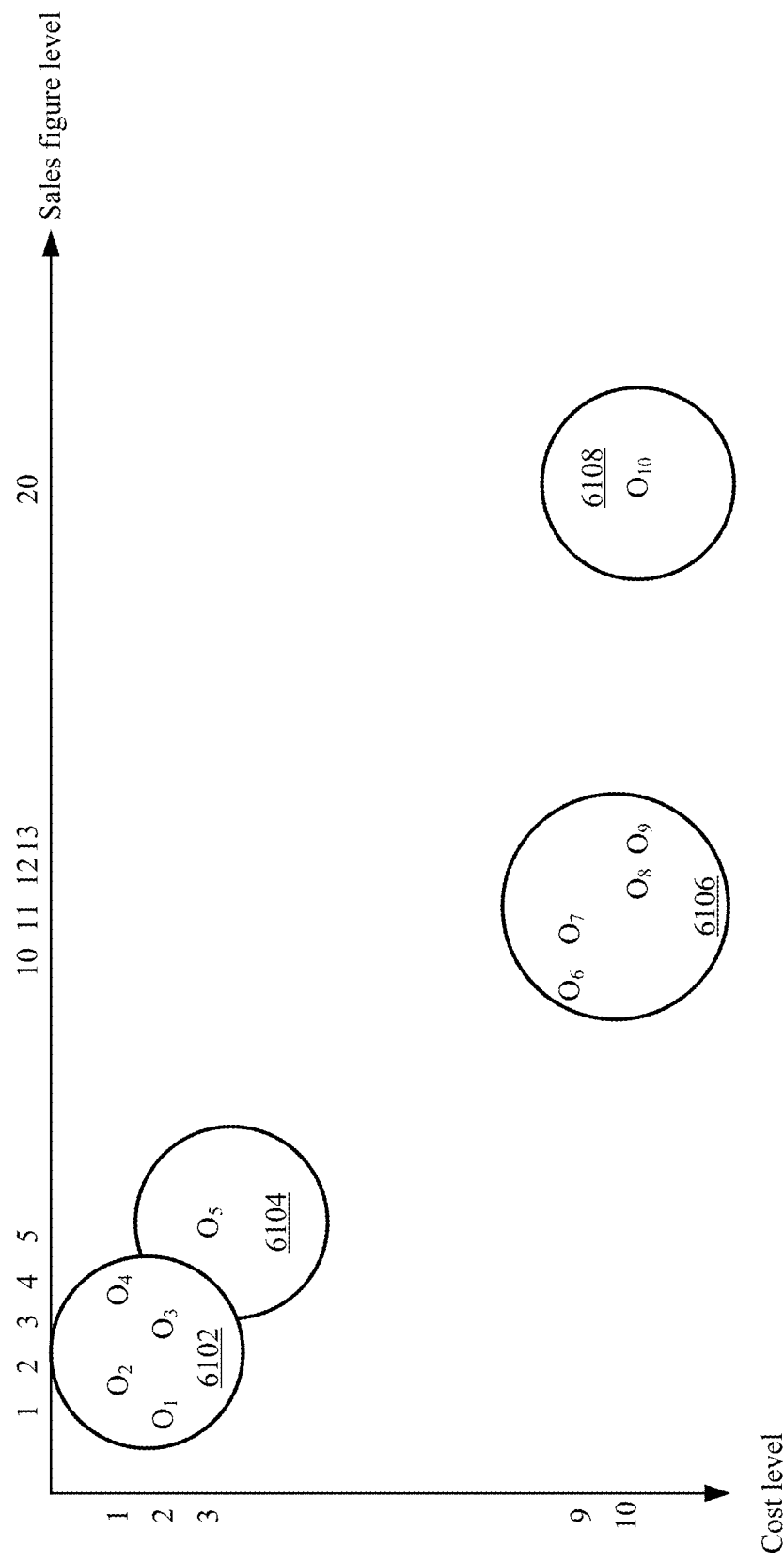
FIG. 53 shows the products on the axes "sales figure level" and "cost level" as well as the clustering according to some embodiments.

Every product $o_i$ can be represented in the 2-dimensional space by $o_i=(l_i, l'_i)$, where $l_i$ is its sales figure level and $l'_i$ is its costs level. FIG. 53 shows the products on the axes "sales figure level" and "cost level" as well as the clustering according to some embodiments. The first or second clustering process may be used based on the conditions defined above. A first cluster 6102 contains the products $o_1, o_2, o_3, o_4$, a second cluster 6104 contains the product $o_5$, a third cluster 6106 contains the products $o_6, o_7, o_8, o_9$, and a fourth cluster 6108 contains the product $o_{10}$.

In a third example, a company sells n products and every product $o_i$, 1≤i≤n, is assigned to k characteristics $l^1, l^2, \ldots, l^k$. That means that $o_i=(l_i^1, l_i^2, \ldots, l_i^k)$ holds. The company wants to cluster its products according to the characteristics $l^1, l^2, \ldots, l^k$. The clustering partitions the product set into disjoint subsets called clusters, such that every cluster only contains "similar" products. Since the "similarity" depends on the observer, the company has to express this "similarity" by defining a distance between two products. The smaller the distance the more similar the two products. In addition, the company has to define the size of the cluster. The smaller the cluster the finer the clustering.

In some embodiments, there are two ways to define the distance between two products: directly and indirectly. In the direct approach, the company freely defines the distance between two products by creating a symmetric table $(t_{i,j})_{i \le i,j \le n}$, such that $t_{i,j}=d(o_i, o_j)$. In this case the distance does not satisfy the triangle inequality in general. In one example, a company has three objects a, b, and c. The company defines the distances as follows: d(a,b)=10, d(a,c)=2, and d(b,c)=3. This distance definition does not satisfy the triangle inequality, because d(a,b)≤d(a,c)+d(b,c) does NOT hold. Hence, the distance violates the definition of triangle inequality. In the indirect approach, in an example where the distance satisfies the triangle inequality (in general the distance does not satisfy the triangle inequality condition): The company first defines a positive value $l_i^r$ for every characteristic 1≤r≤k of every product $o_i$, 1≤i≤n. Then the company defines the distance referring to the r-th characteristic by $d^r(o_i, o_j)=|l_i^r-l_j^r|$. Finally, the company defines the distance between two products $o_i$, $o_j$ by:

$$d(o_i, o_j) = a_1 d^1(o_i, o_j) + a_2 d^2(o_i, o_j) + \ldots + a_k d^k(o_i, o_j),$$

where $a_1, a_2, a_k$ are positive numbers.

The numbers $a_1, a_2, \ldots, a_k$ can be used to express the weight of the characteristics $l^1, l^2, \ldots, l^k$. For example, if the characteristic $l^1$ should be more important than characteristic $l^k$, then $a_1 \geq a_k$ is set. It is noted that the company can indirectly define the distance between two products in other ways. But, by using the previous way it can be proved that the defined distance satisfies the triangle inequality of $d(a, b) \leq d(a,c)+d(b,c)$, and so on.

After the definition of the distance, the radius of the cluster is defined. Then the clustering can be calculated, by running one of the given two clustering processes 104 and 106. First clustering process 104 can be run in any case, independent on whether or not the definition of the distance satisfies the triangle inequality. But, the time performance second clustering process 106 may be better than the time performance of first clustering process 104 due to using less comparisons.

CONCLUSION

Accordingly, second clustering process 106 may generate clusters without having to perform comparisons between each of the objects in the set. This reduces the time needed to determine the clusters. Further, the generation of the clusters uses less computing resources. This may be important when a large number of objects are being compared for a company.

System

FIG. 54 illustrates hardware of a special purpose computing machine configured with computing system 102 according to one embodiment. An example computer system 6210 is illustrated in FIG. 54. Computer system 6210 includes a bus 6205 or other communication mechanism for communicating information, and a processor 6201 coupled with bus 6205 for processing information. Computer system 6210 also includes a memory 6202 coupled to bus 6205 for storing information and instructions to be executed by processor 6201, including information and instructions for performing the techniques described above, for example. This memory may also be used for storing variables or other intermediate information during execution of instructions to be executed by processor 6201. Possible implementations of this memory may be, but are not limited to, random access memory (RAM), read only memory (ROM), or both. A storage device 6203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 6203 may include source code, binary code, or software files for performing the techniques above, for example. Storage device and memory are both examples of computer readable storage mediums.

Computer system 6210 may be coupled via bus 6205 to a display 6212, such as a cathode ray tube (CRT) or liquid crystal display (LCD), for displaying information to a computer user. An input device 6211 such as a keyboard and/or mouse is coupled to bus 6205 for communicating information and command selections from the user to processor 6201. The combination of these components allows the user to communicate with the system. In some systems, bus 6205 may be divided into multiple specialized buses.

Computer system 6210 also includes a network interface 6204 coupled with bus 6205. Network interface 6204 may provide two-way data communication between computer system 6210 and the local network 6220. The network interface 6204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 6204 sends and receives electrical, electromagnetic, or optical signals that carry digital data streams representing various types of information.

Computer system 6210 can send and receive information through the network interface 6204 across a local network 6220, an Intranet, or the Internet 6230. In the Internet example, software components or services may reside on multiple different computer systems 6210 or servers 6231-6235 across the network. The processes described above may be implemented on one or more servers, for example. A server 6231 may transmit actions or messages from one component, through Internet 6230, local network 6220, and network interface 6204 to a component on computer system 610. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, a set of objects for creating clusters based on a similarity measure between the objects;

generating, by the computing device, a data structure for the set of objects, wherein a first value is inserted in an entry between objects when the similarity measure is less than a value and a second value is inserted in the entry between the objects when the similarity measure is greater than the value;

generating, by the computing device, link counts for objects by constructing links between objects in the set of objects based on entries between the objects including the first value or the second value, wherein a link is constructed between the objects when the entry for the respective objects includes the first value;

selecting, by the computing device, an object that has a largest link count in the set of objects, the link count being a number of objects that are linked to the selected object;

creating, by the computing device, a cluster including the selected object and any objects that are linked to the selected object via the links;

removing, by the computing device, the objects in the cluster from the set of objects and reducing a link count for objects that are linked to the removed objects; and performing, by the computing device, the selecting of another object, the creating a cluster of objects for the another object, and the removing steps until all objects have been added to a cluster.

2. The method of claim 1, wherein the similarity measure comprises a distance.

3. The method of claim 1, wherein the similarity measure comprises a radius of a cluster.

4. The method of claim 1, wherein generating the link counts between the objects comprises:
selecting a first object;
creating a link between the first object and another object in the set of objects when an entry in the data structure for the another object and the first object includes the first value; and
not creating a link between the first object and another object in the set of objects when the entry in the data structure for the another object and the first object includes the second value.

5. The method of claim 4, wherein generating the link counts between the objects comprises:
increasing a link count for the first object and the another object when a link between the first object and the another object is constructed.

6. The method of claim 1, wherein removing the objects in the cluster and reducing the link count for objects that are linked to the removed objects comprises:
selecting a first object in the cluster that is linked to the selected object; and
decreasing a link count for the first object.

7. The method of claim 6, wherein removing the objects in the cluster and reducing the link count for objects that are linked to the removed objects comprises:
selecting any second objects that are linked to the first object; and
decreasing a link count for the any second objects.

8. The method of claim 7, wherein removing the objects in the cluster and reducing the link count for objects that are linked to the removed objects comprises:
performing the selecting the first object, decreasing the link count, selecting any second objects that are linked to the first object, and decreasing the link count for the any second objects for every object in the cluster.

9. The method of claim 1, further comprising:
determining that all objects linked to the selected object have been removed; and
upon determining that all the objects linked to the selected object have been removed, performing the selecting, the creating, and the removing steps until all remaining objects in the set of objects have been added to a cluster.

10. The method of claim 1, wherein performing the selecting, the creating, and the removing steps until all objects have been added to a cluster comprises:
selecting a next object that has the largest link count;
creating another cluster including the next object and any objects that are linked to the next object via the links; and
removing the objects in the another cluster and reducing a link count for objects that are linked to the removed objects.

11. The method of claim 1, further comprising:
updating the data structure upon removing the objects and reducing the link counts, wherein updating changes the first value to the second value for the objects in the cluster when the object is removed.

12. The method of claim 1, further comprising:
generating a data structure with the link counts for the set of objects; and
reducing the link counts from the data structure for objects that are linked to the removed objects.

13. The method of claim 1, wherein the clusters of objects are created by a first clustering process, the method further comprising:
comparing the set of objects to a condition; and
determining whether to perform the first clustering process or a second clustering process based on the comparing.

14. The method of claim 13, wherein:
the second clustering process is performed when the condition is met, and the first clustering process is performed when the condition is not met.

15. The method of claim 13, wherein the second clustering process comprises:
selecting, by the computing device, an object in the set of objects;
constructing, by the computing device, a plurality of structures around the object, wherein a size of each structure is a multiple of the similarity measure;
selecting, by the computing device, a cluster of objects by analyzing objects within a first structure and a second structure in the plurality of structures around the object, wherein objects outside of the first structure and the second structure are not analyzed;
removing, by the computing device, the cluster of objects from the set of objects for creating clusters; and
performing, by the computing device, the selecting of a cluster of objects for another object in the remaining objects in the set of objects and the removing the cluster of objects for the another object until all objects have been added to a cluster.

16. A non-transitory computer-readable storage medium containing instructions, that when executed, control a computer system to be configured for:
receiving a set of objects for creating clusters based on a similarity measure between the objects;
generating a data structure for the set of objects, wherein a first value is inserted in an entry between objects when the similarity measure is less than a value and a second value is inserted in the entry between the objects when the similarity measure is greater than the value;
generating link counts for objects by constructing links between objects in the set of objects based on entries between the objects including the first value or the second value, wherein a link is constructed between the objects when the entry for the respective objects includes the first value;
selecting an object that has a largest link count in the set of objects, the link count being a number of objects that are linked to the selected object;
creating a cluster including the selected object and any objects that are linked to the selected object via the links;

removing the objects in the cluster from the set of objects and reducing a link count for objects that are linked to the removed objects; and performing the selecting of another object, the creating a cluster of objects for the another object, and the removing steps until all objects have been added to a cluster.

17. The non-transitory computer-readable storage medium of claim 16, wherein generating the link counts between the objects comprises:

selecting a first object;

creating a link between the first object and another object in the set of objects when an entry in the data structure for the another object and the first object includes the first value; and not creating a link between the first object and another object in the set of objects when the entry in the data structure for the another object and the first object includes the second value.

18. The non-transitory computer-readable storage medium of claim 16, further comprising:

determining that all objects linked to the selected object have been removed; and upon determining that all the objects linked to the selected object have been removed, performing the selecting, the creating, and the removing steps until all remaining objects in the set of objects have been added to a cluster.

19. The non-transitory computer-readable storage medium of claim 16, wherein performing the selecting, the creating, and the removing steps until all objects have been added to a cluster comprises:

selecting a next object that has the largest link count;

creating another cluster including the next object and any objects that are linked to the next object via the links; and removing the objects in the another cluster and reducing a link count for objects that are linked to the removed objects.

20. An apparatus comprising:

one or more computer processors; and a non-transitory computer-readable storage medium comprising instructions, that when executed, control the one or more computer processors to be configured for:

receiving a set of objects for creating clusters based on a similarity measure between the objects;

generating a data structure for the set of objects, wherein a first value is inserted in an entry between objects when the similarity measure is less than a value and a second value is inserted in the entry between the objects when the similarity measure is greater than the value;

generating link counts for objects by constructing links between objects in the set of objects based on entries between the objects including the first value or the second value, wherein a link is constructed between the objects when the entry for the respective objects includes the first value;

selecting an object that has a largest link count in the set of objects, the link count being a number of objects that are linked to the selected object;

creating a cluster including the selected object and any objects that are linked to the selected object via the links;

removing the objects in the cluster from the set of objects and reducing a link count for objects that are linked to the removed objects; and performing the selecting of another object, the creating a cluster of objects for the another object, and the removing steps until all objects have been added to a cluster.

* * * * *